(12) United States Patent
Yanahara et al.

(10) Patent No.: US 12,011,858 B2
(45) Date of Patent: Jun. 18, 2024

(54) CONNECTION FOR DIFFERENT STRUCTURES THAT SLIDE TOGETHER

(71) Applicant: Canon Virginia, Inc., Newport News, VA (US)

(72) Inventors: Yuichi Yanahara, Moriyama (JP); Junko Tajima, Amsterdam (NL)

(73) Assignees: Canon Virginia, Inc., Newport News, VA (US); Canon U.S.A., Inc., Melville, NY (US)

(*) Notice: Subject to any disclaimer, the term of this patent is extended or adjusted under 35 U.S.C. 154(b) by 0 days.

(21) Appl. No.: 17/262,500

(22) PCT Filed: Jul. 10, 2019

(86) PCT No.: PCT/US2019/041254
§ 371 (c)(1),
(2) Date: Jan. 22, 2021

(87) PCT Pub. No.: WO2020/023212
PCT Pub. Date: Jan. 30, 2020

(65) Prior Publication Data
US 2021/0291417 A1   Sep. 23, 2021

Related U.S. Application Data

(60) Provisional application No. 62/702,701, filed on Jul. 24, 2018.

(51) Int. Cl.
*B29C 45/00*   (2006.01)
*B29C 45/04*   (2006.01)
(Continued)

(52) U.S. Cl.
CPC ...... *B29C 45/0408* (2013.01); *B29C 45/1756* (2013.01); *B29C 45/66* (2013.01)

(58) Field of Classification Search
CPC .............. B29C 45/0408; B29C 45/162; B29C 2045/1637; B29C 45/1705
See application file for complete search history.

(56) References Cited

U.S. PATENT DOCUMENTS 5,033,955 A   7/1991   Faig et al.
5,456,588 A   10/1995   Yonekubo et al.
(Continued)

FOREIGN PATENT DOCUMENTS

CN   1410251 A   4/2003
CN   103153577 A   6/2013
(Continued)

*Primary Examiner* — Alison L Hindenlang
*Assistant Examiner* — Debjani Roy
(74) *Attorney, Agent, or Firm* — Canon U.S.A., Inc., IP Division

(57) ABSTRACT

A moving system for structures includes a linking unit located between first and second structures that can move in a first direction. A drive unit is connected to the first structure, and the first and second structures are connected. The second structure moves along the first direction when the drive unit moves the first structure along the first direction. The linking unit has a first part located on the side of the first structure and a second part located on the side of the second structure. The first and second parts line up along the first direction. The first part can shift toward the second part in a second direction different from the first direction without moving along the first direction, and the second part can shift toward the first part in the second direction without moving along the first direction.

11 Claims, 20 Drawing Sheets

(51) Int. Cl.
  *B29C 45/17* (2006.01)
  *B29C 45/66* (2006.01)

(56) References Cited

U.S. PATENT DOCUMENTS

| | | | |
|---|---|---|---|
| 5,837,301 A | 11/1998 | Arnott et al. | |
| 6,110,173 A * | 8/2000 | Thomas, Jr. | A61B 17/7052 |
| | | | 606/252 |
| 6,113,382 A | 9/2000 | McNally | |
| 6,488,163 B1 | 12/2002 | Wurzer et al. | |
| 6,613,262 B1 * | 9/2003 | Arend | B29C 45/6728 |
| | | | 264/328.8 |
| 11,104,050 B2 | 8/2021 | Nakamura | |
| 2001/0028901 A1 | 10/2001 | Hagenmeyer | |
| 2002/0140132 A1 | 10/2002 | Seta et al. | |
| 2003/0232176 A1 | 12/2003 | Polk et al. | |
| 2005/0095311 A1 * | 5/2005 | Nishizawa | B29C 45/062 |
| | | | 425/375 |
| 2006/0172039 A1 | 8/2006 | Mai | |
| 2007/0218161 A1 * | 9/2007 | Nagano | B29C 45/062 |
| | | | 425/451.9 |
| 2012/0251654 A1 | 10/2012 | Schibsbye | |
| 2013/0129858 A1 | 5/2013 | Fujita | |
| 2014/0265016 A1 | 10/2014 | Nguyen et al. | |
| 2014/0299263 A1 | 10/2014 | Pozgainer et al. | |
| 2015/0048545 A1 * | 2/2015 | Gehring | B29C 45/1618 |
| | | | 425/134 |
| 2016/0039135 A1 | 2/2016 | Armbruster | |
| 2018/0009146 A1 | 1/2018 | Nakamura | |
| 2019/0314061 A1 * | 10/2019 | Shoshtaev | A61B 17/7055 |

FOREIGN PATENT DOCUMENTS

| | | | |
|---|---|---|---|
| CN | 206383399 | * | 11/2016 |
| CN | 206383399 A | | 8/2017 |
| CN | 206383399 U | | 8/2017 |
| CN | 107186954 A | | 9/2017 |
| CN | 206520155 U | | 9/2017 |
| DE | 4000849 A1 | | 8/1990 |
| EP | 0092685 A1 | | 11/1983 |
| EP | 2958729 A1 | | 12/2015 |
| JP | S615622 U | | 1/1986 |
| JP | S62-189115 U | | 12/1987 |
| JP | H01-171620 U | | 5/1988 |
| JP | S63-242511 A | | 10/1988 |
| JP | 06-278158 A | | 10/1994 |
| JP | 2002192563 A | | 7/2002 |
| JP | 2005138367 A | | 6/2005 |
| JP | 2007-245398 A | | 9/2007 |
| JP | 2009-149042 A | | 7/2009 |
| JP | 2010-083085 A | | 4/2010 |
| JP | 2014-195960 A | | 10/2014 |
| JP | 2016-112771 A | | 6/2016 |
| JP | 6121601 B1 | | 4/2017 |
| JP | 2018-001738 A | | 1/2018 |
| JP | 06-460508 B1 | | 1/2019 |
| JP | 2019-177660 A | | 10/2019 |
| RU | 77838 U1 | | 11/2008 |

\* cited by examiner

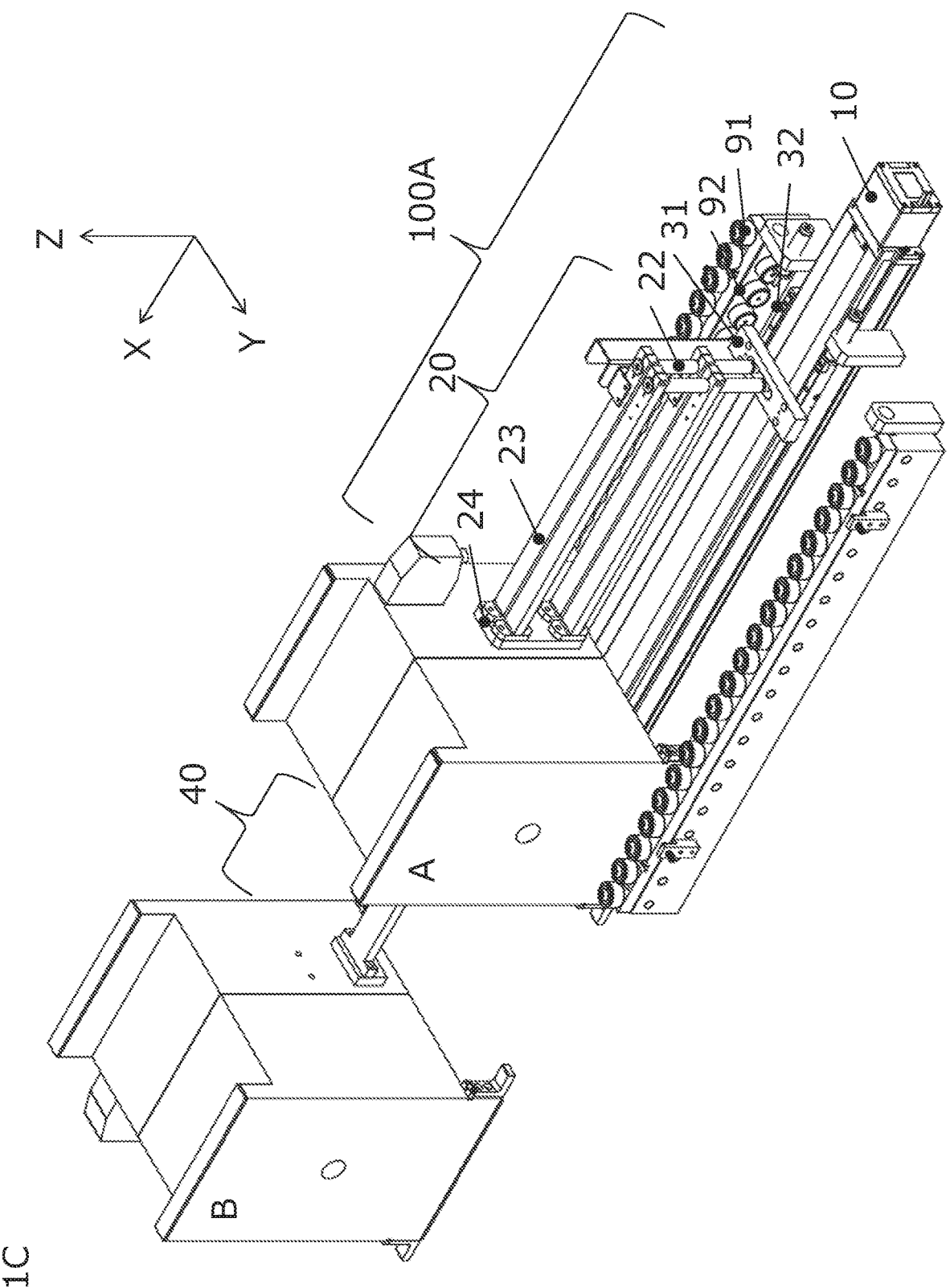

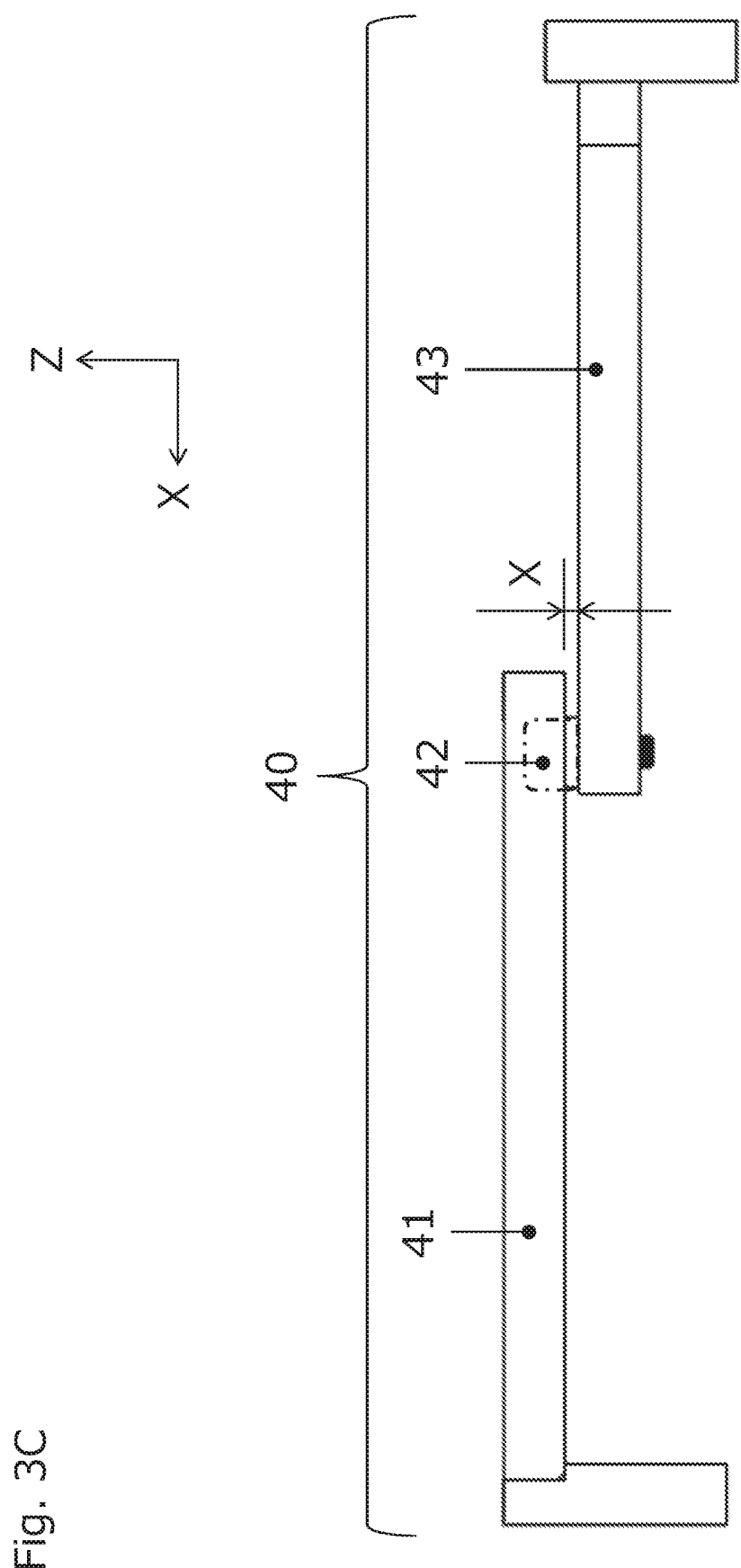

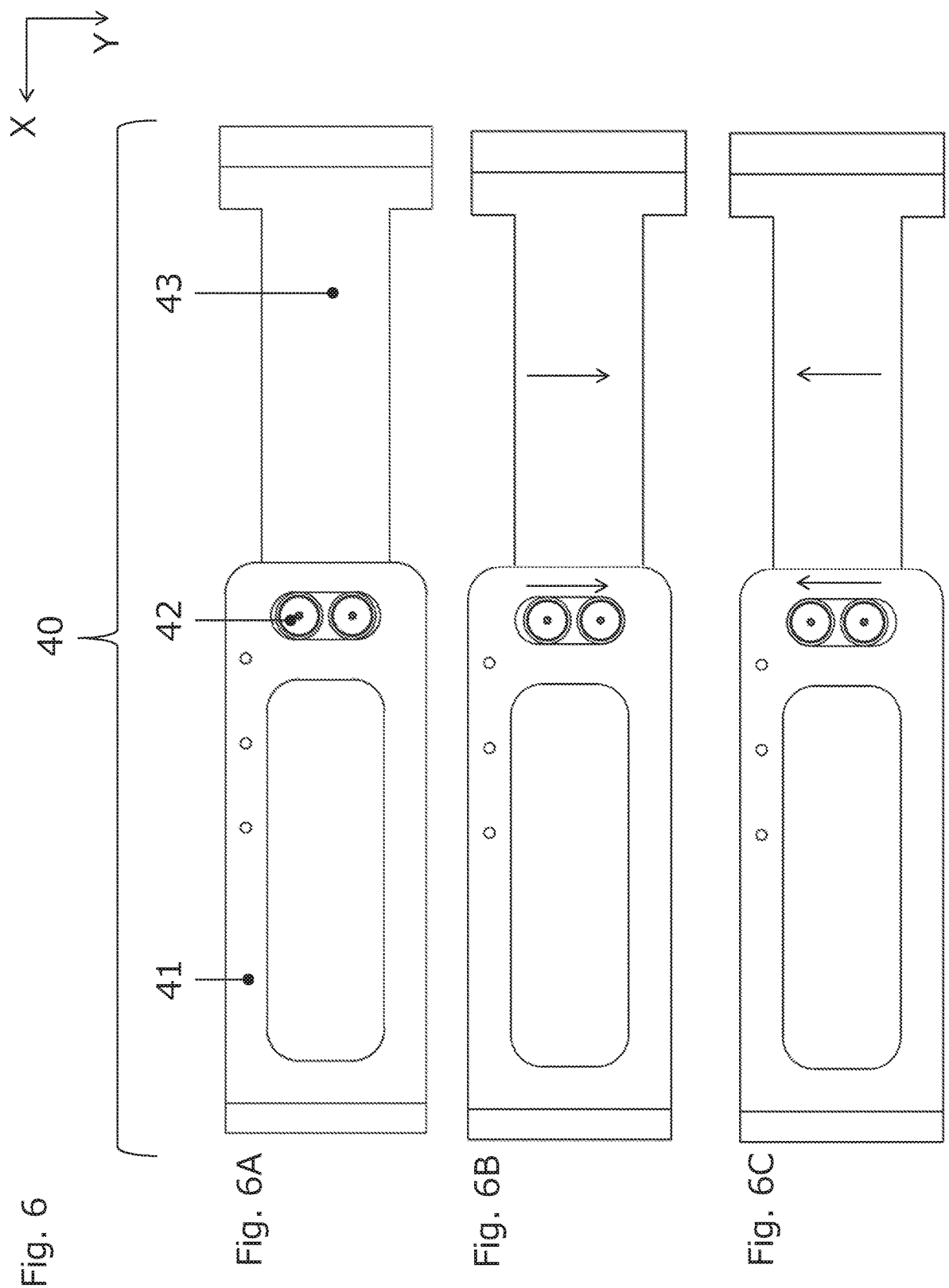

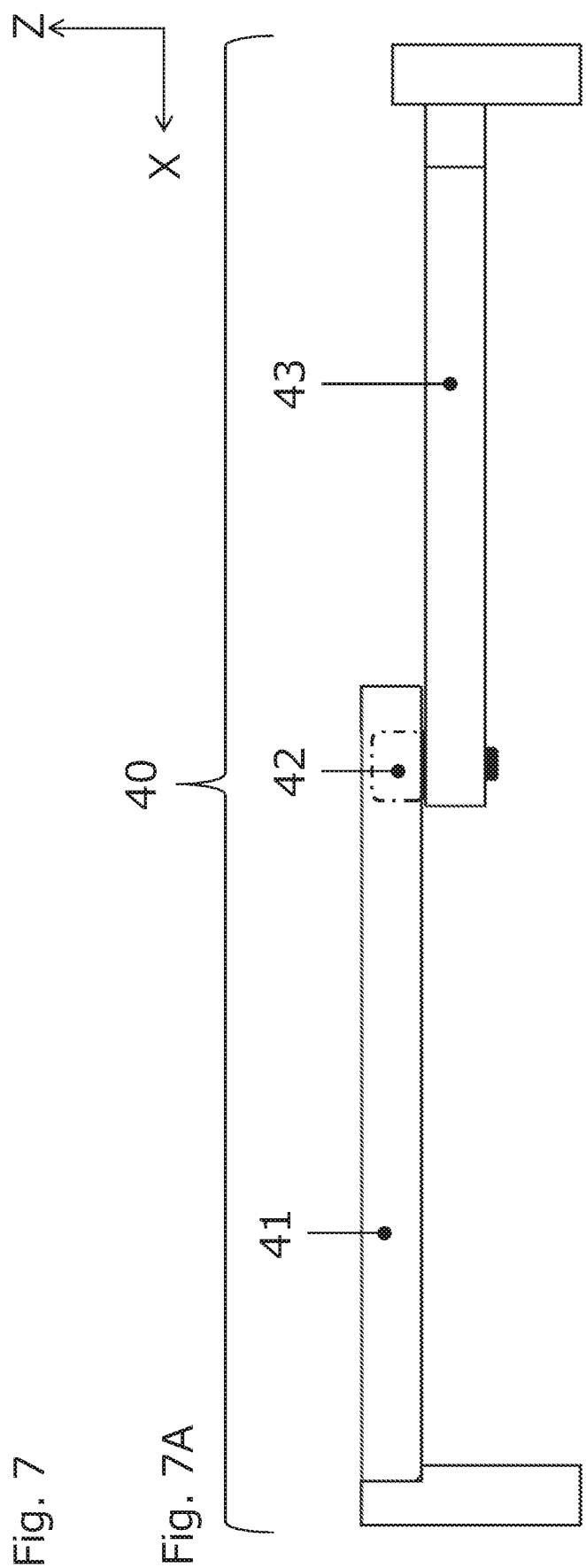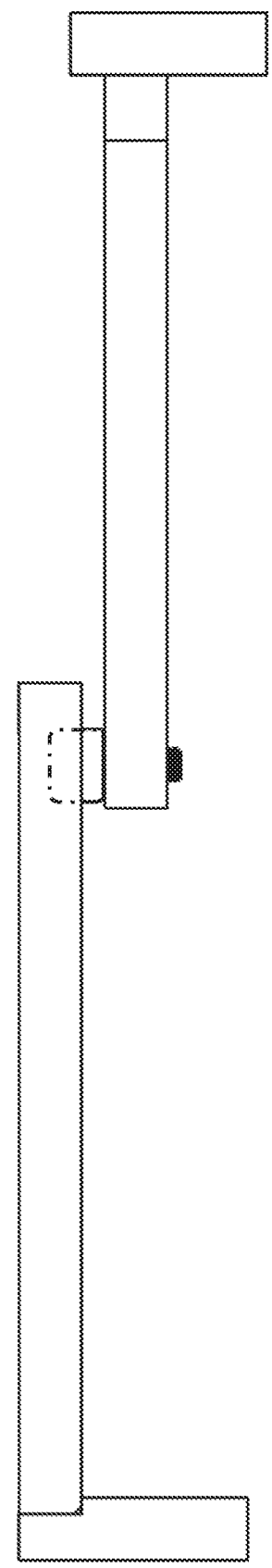

Fig 8
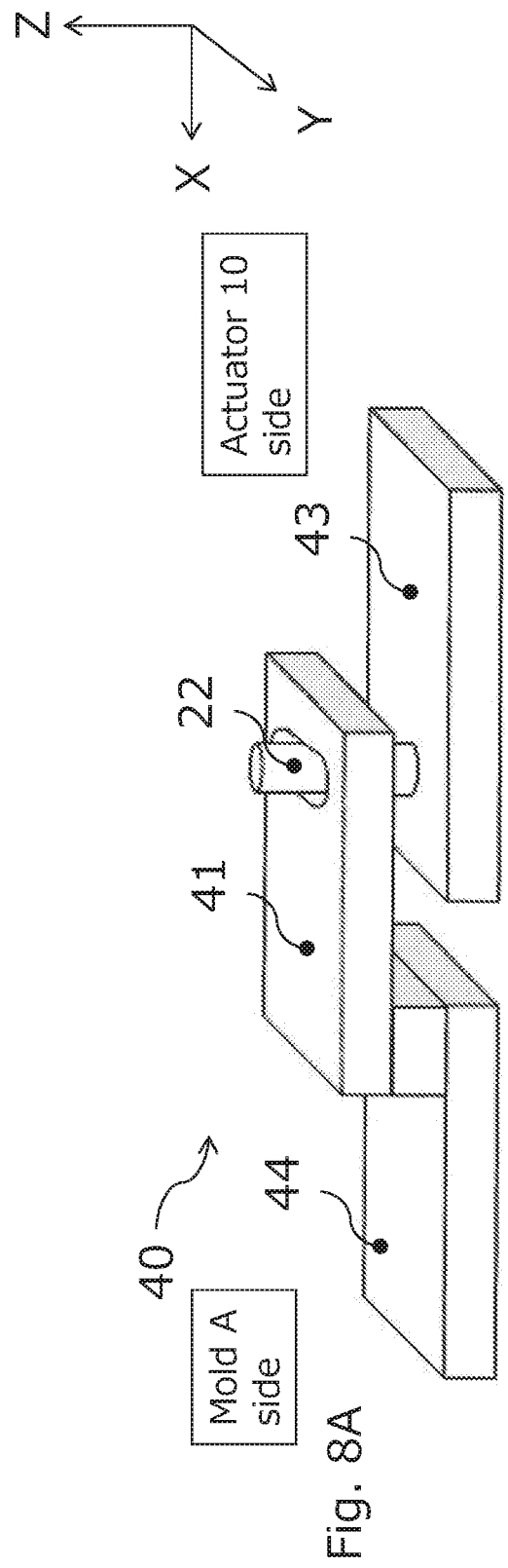
Fig. 8A
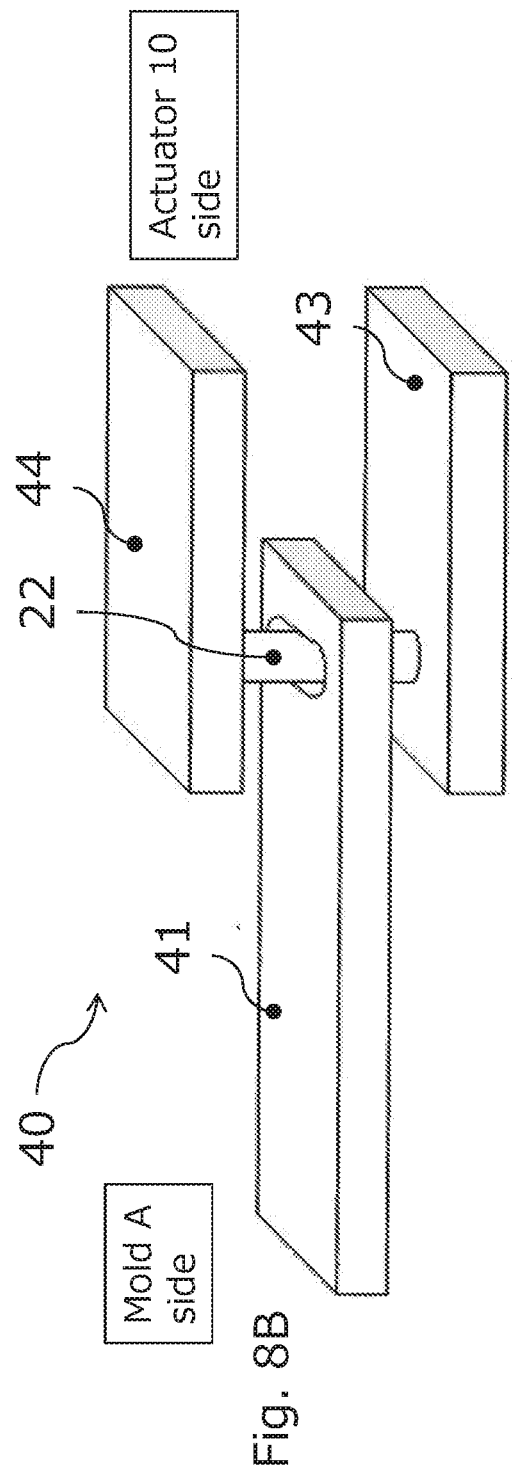
Fig. 8B

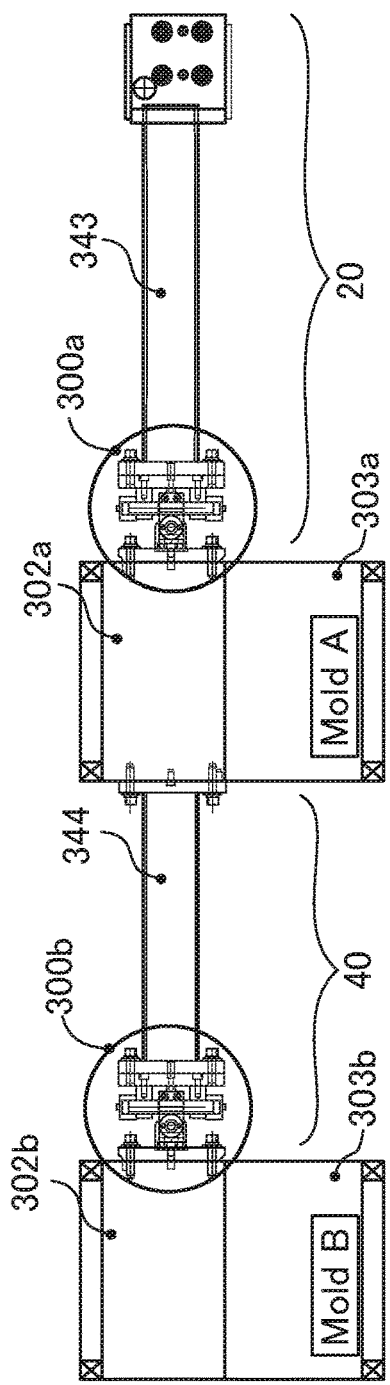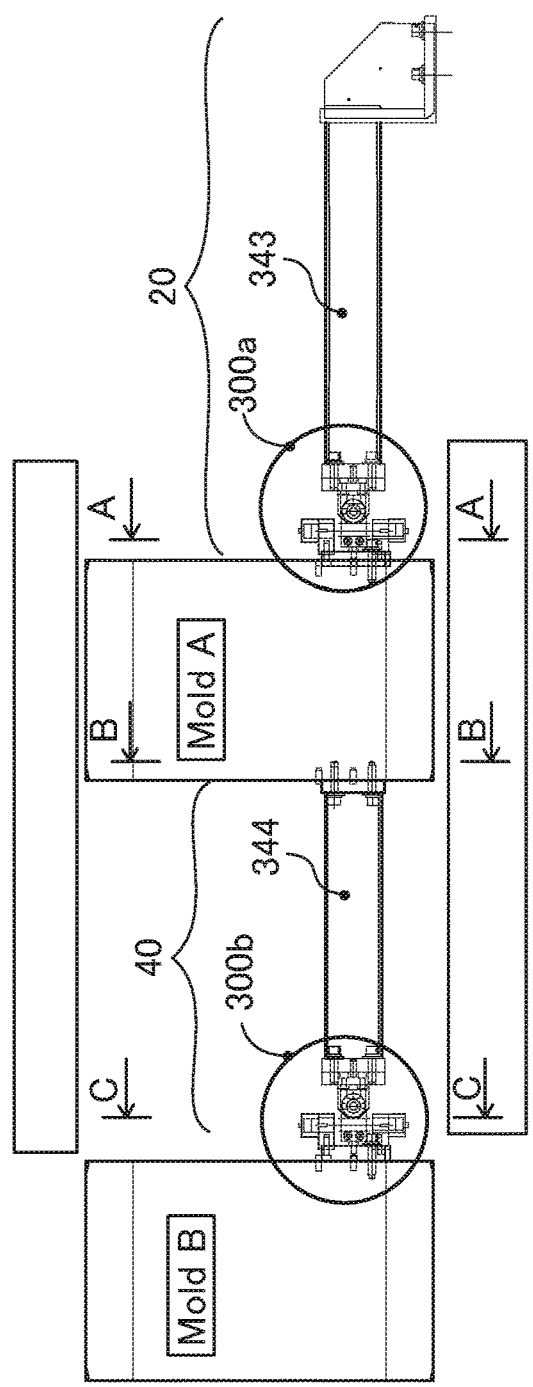
Fig. 10
Fig. 10A
Fig. 10B

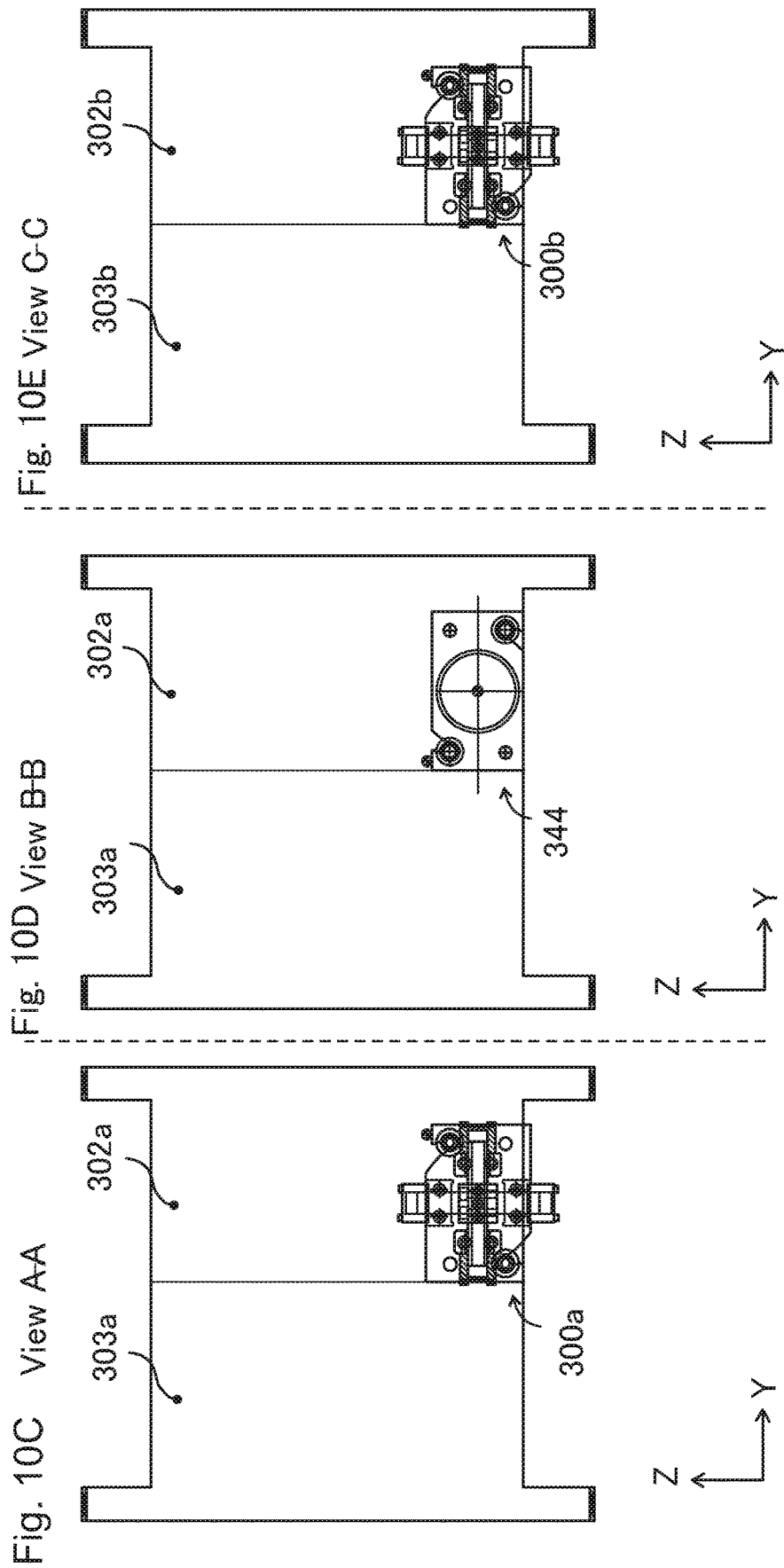

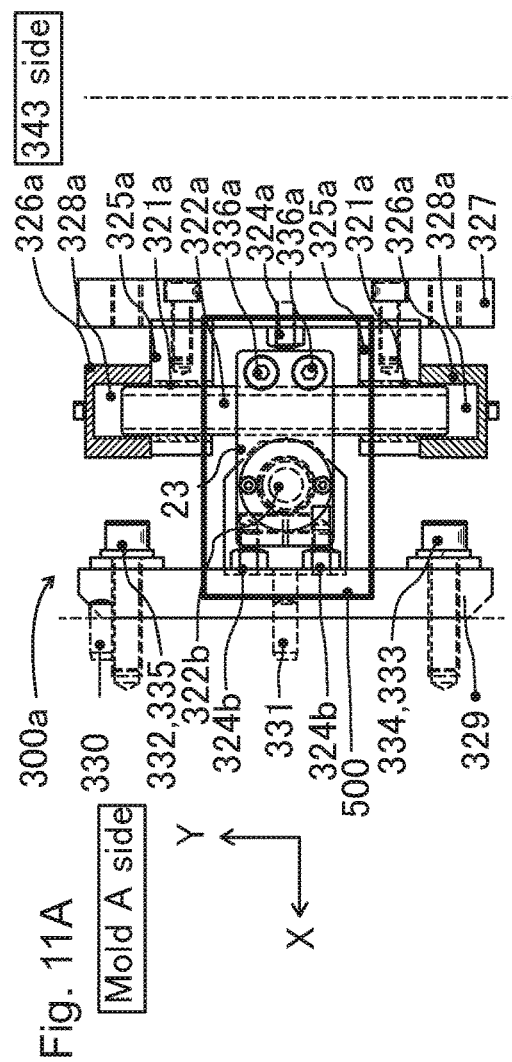
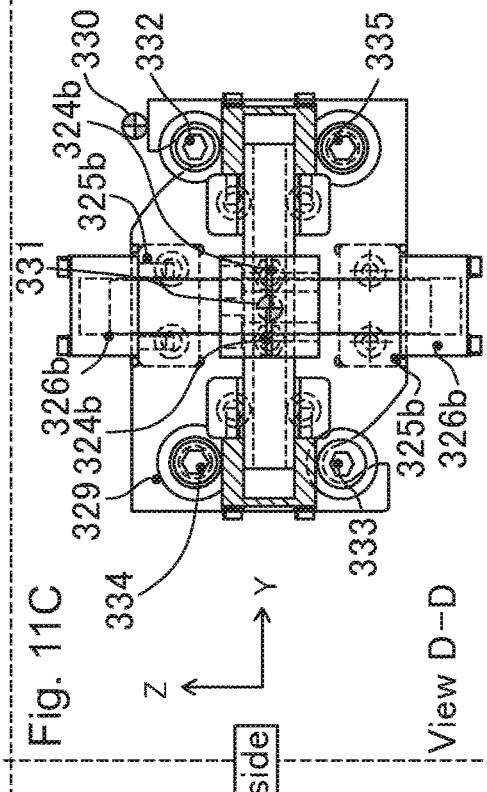
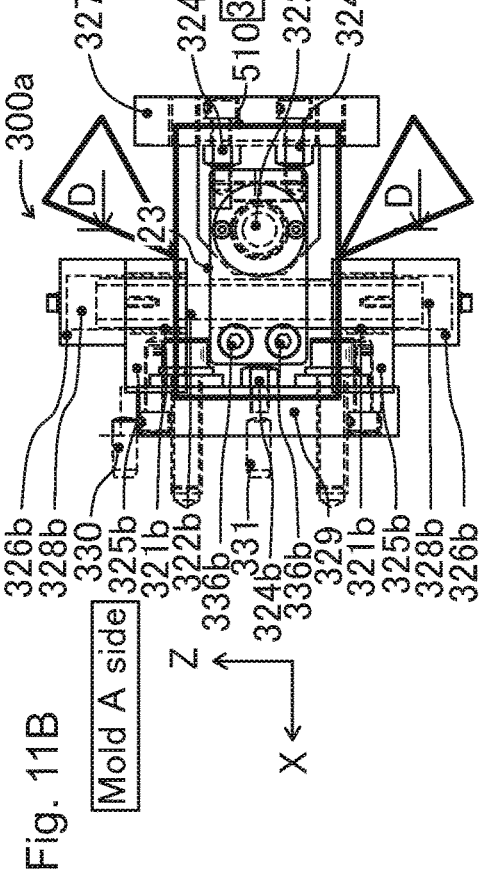

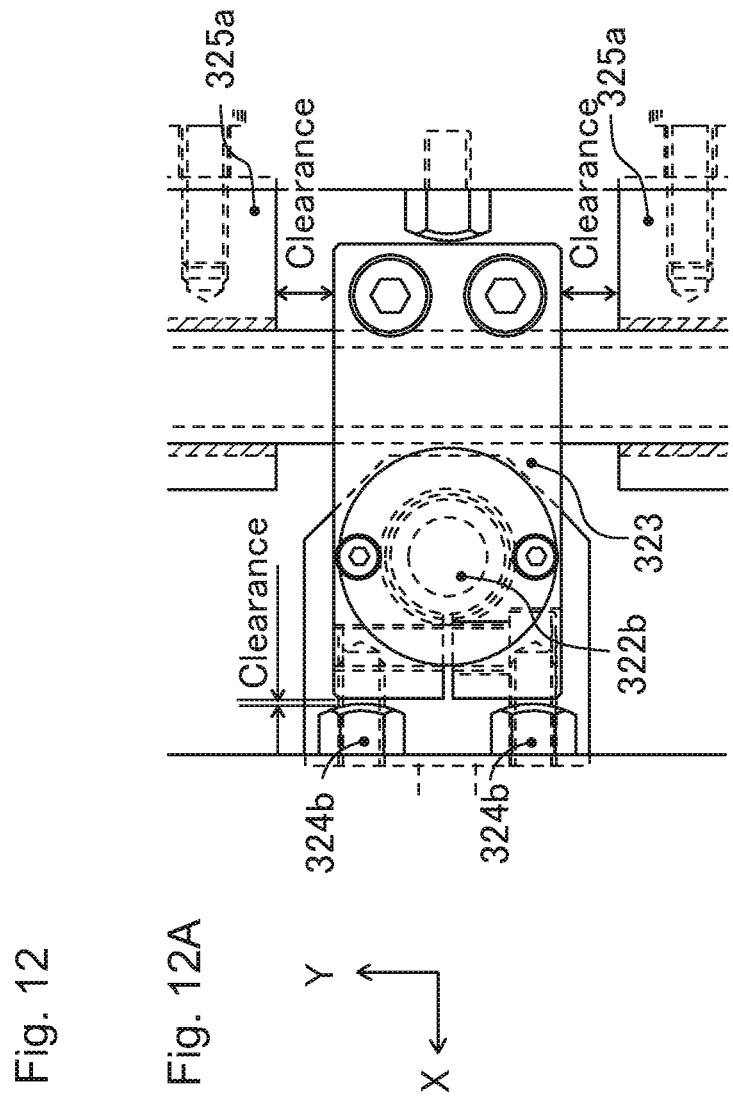

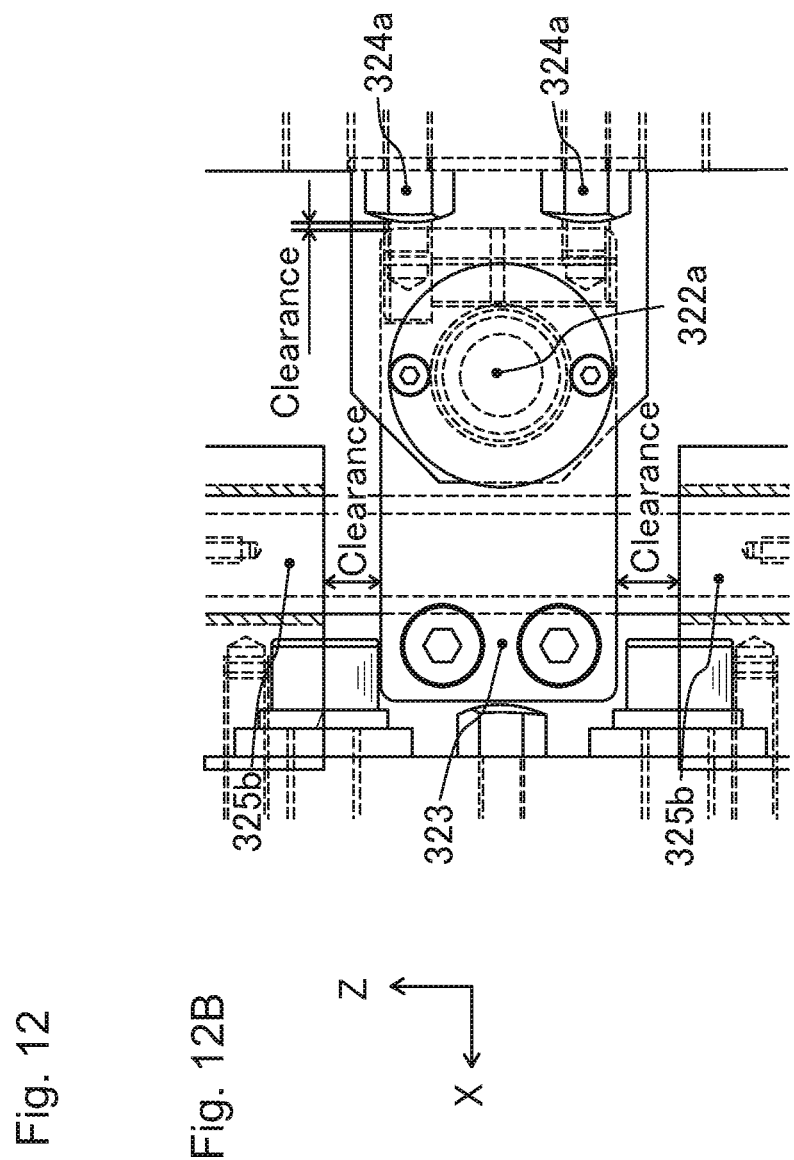

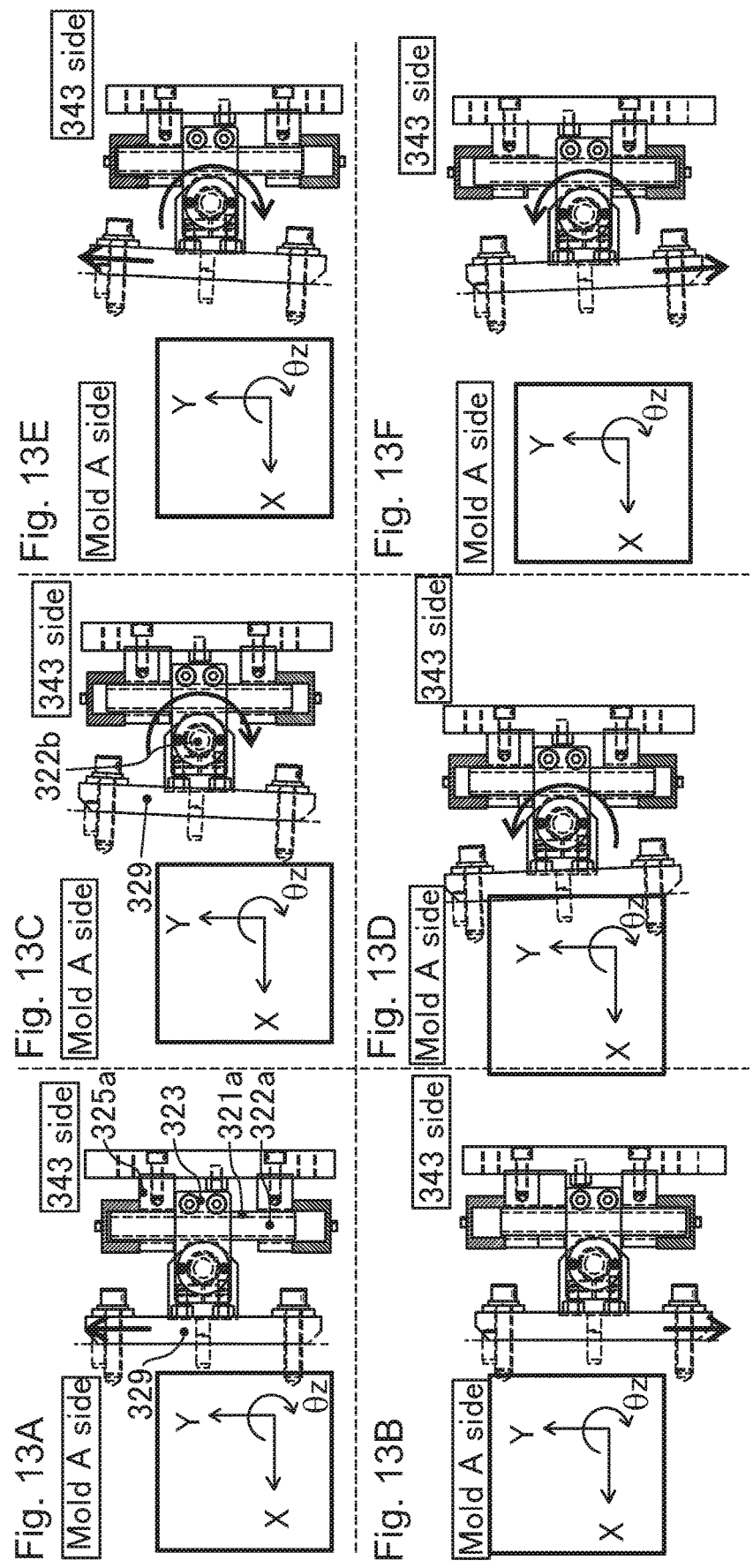

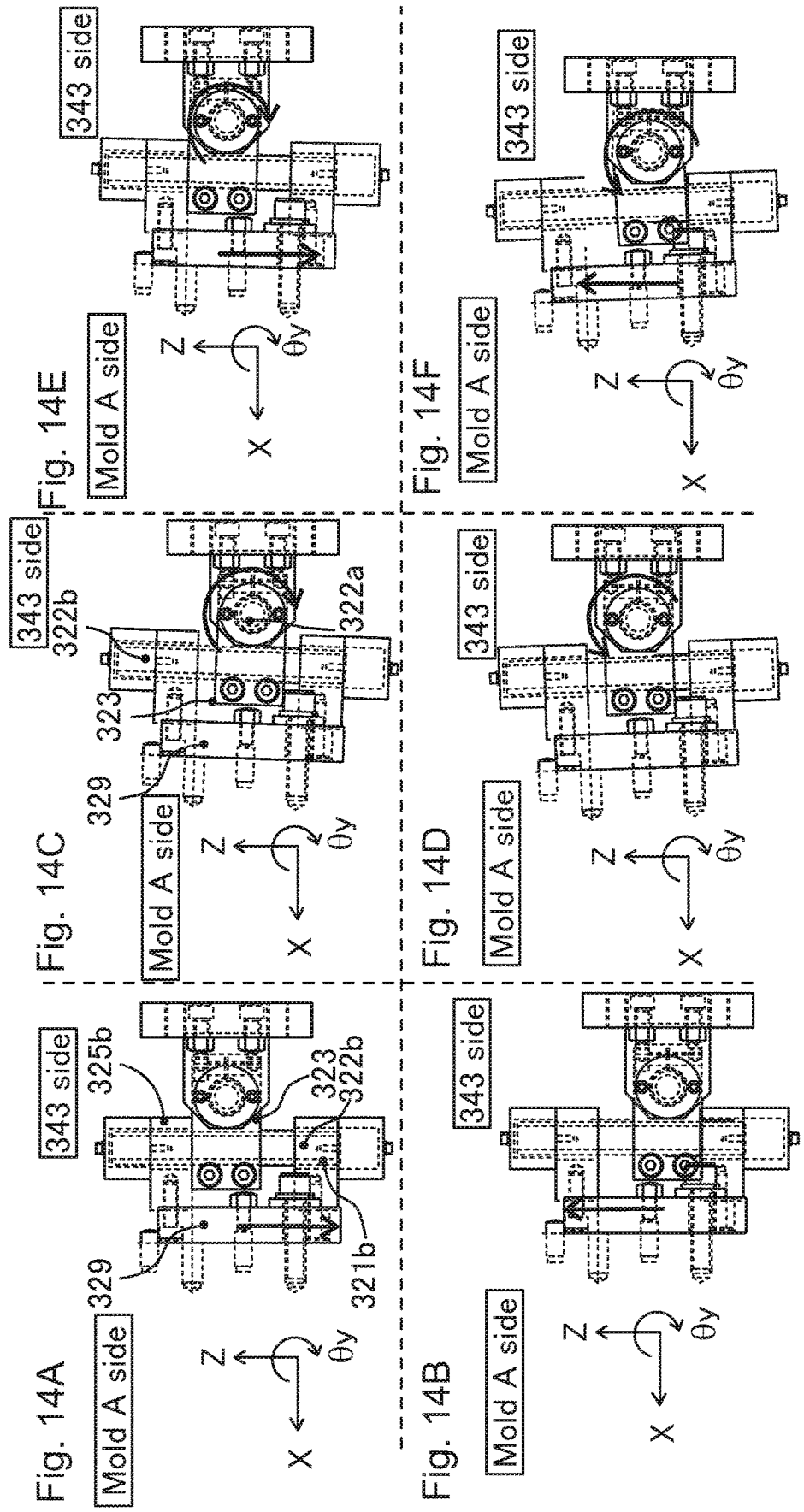

CONNECTION FOR DIFFERENT STRUCTURES THAT SLIDE TOGETHER

BACKGROUND

Field

The present disclosure generally relates to injection molding devices.

Description of the Related Art

In general, manufacturing process for injection molding machine is injection, cooling, and taking out molded parts, but injection molding machine does not move during cooling, so productivity is limited. According to US 2018/0009146, it suggests manufacturing method for molded parts while switching between two dies (molds) for one injection molding machine. In US 2018/0009146, as a method of moving two dies, first die transfer is done by one side of left and right of the injection molding machine, and second die transfer is placed on other side of the left and right of the injection molding machine, and runs on second transfer device independent from the first transfer device.

When moving die from injection position to cooling position, or cooling position to injection position, it is necessary to have an actuator that is able to move the weight of die itself, injected resin weight and the weight of linking unit between dies. On the other hand, cost reduction in manufacturing process is important, and if two actuators that can move dies are installed, cost of the actuator itself increases, and the space to install two actuators becomes necessary, thus the size of the equipment may increase.

In general dies are manufactured by metal such as steel, and is heavy goods weighing from few kilos to few tons. Also each dies are not exact same dimension, and load occurs from misalignment of dies when moving dies which are heavy goods. If multiple dies are linked to single transferring device, transferring device may breakdown quickly, and in worst case, problem may occur such as not being able to move dies by transferring device.

SUMMARY

Aspects of the present disclosure provide the technology to move multiple dies by transferring device using actuator, and prevents cost increase or size increase to manufacturing device, and provides stable production technology. According to aspects of the present disclosure, there is a configuration of two parts with slippage and a slot of base plate. By doing so, disperses load from misalignment to Z direction, Y direction of die, and prevents from giving excess load to actuator, and as well as preventing damage to actuator, it can prevent the high cost due to increase in cost by selecting larger actuator to handle loads. Also by setting to this configuration, it is unnecessary to require excessive position adjustment for table section or excessive position accuracy of side surface guide roller, bottom surface guide roller to the injection molding machine, makes it achievable to reduce cost by easing machine parts precision or reduce man-hour during assembly.

The present disclosure is directed to an injection molding system including an injection molding apparatus configured to perform injection molding with a first mold and a second mold, a linking unit configured to link between the first mold and the second mold, and an actuator connectable with the first mold and configured to move the first mold along a supporting plane into the injection molding apparatus. When the actuator moves the first mold, the linking unit is configured to transmit force from the first mold to the second mold and the second mold is moved by the first mold. The linking unit is configured to link between the first mold and the second mold so that the first mold is movable in a direction which intersects the supporting plane with respect to the second mold, or the second mold is movable in the direction with respect to the first mold.

Further features of aspects of the present disclosure will become apparent from the following description of exemplary embodiments (with reference to the attached drawings).

BRIEF DESCRIPTION OF THE DRAWINGS

FIGS. 1A, 1B, and 1C show the appearance drawing of adaptable injection molding machine.

FIGS. 3A, 3B, and 3C are schematic drawings showing the linking units according to a first embodiment.

FIG. 6 (FIGS. 6A, 6B, and 6C) are drawings showing the linking unit between the dies A and B.

FIG. 7 (FIGS. 7A and 7B) are drawings showing side view of the linking unit between the dies A and B.

FIG. 8 (FIGS. 8A and 8B) is a drawing showing a linking unit according to another embodiment.

FIG. 10 (FIG. 10A through FIG. 10E) are drawings showing the linking unit according to a second embodiment.

FIG. 11 (FIGS. 11A through 11C) are detail views of the linking unit according to the second embodiment.

FIG. 12 (FIG. 12A and FIG. 12B) are enlarged views of the linking unit according to the second embodiment.

FIG. 13 (FIGS. 13A through 13F) are drawings showing a movement of the linking unit according to the second embodiment.

FIG. 14 (FIGS. 14A through 14F) are drawings showing a movement of the linking unit according to the second embodiment.

DESCRIPTION OF THE EMBODIMENTS

First Embodiment

<System Overview>

Figure 1A:
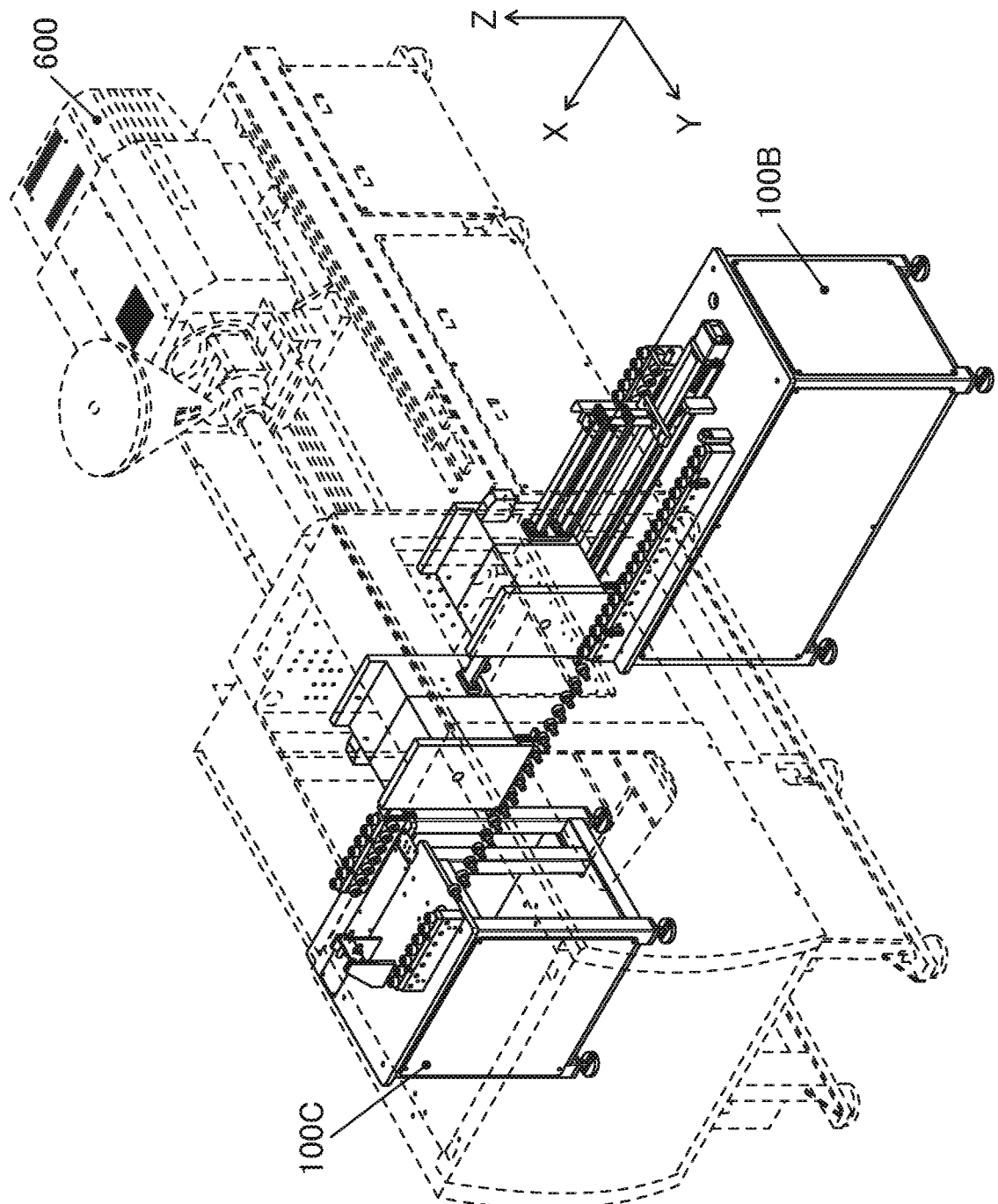
Figure 1B:
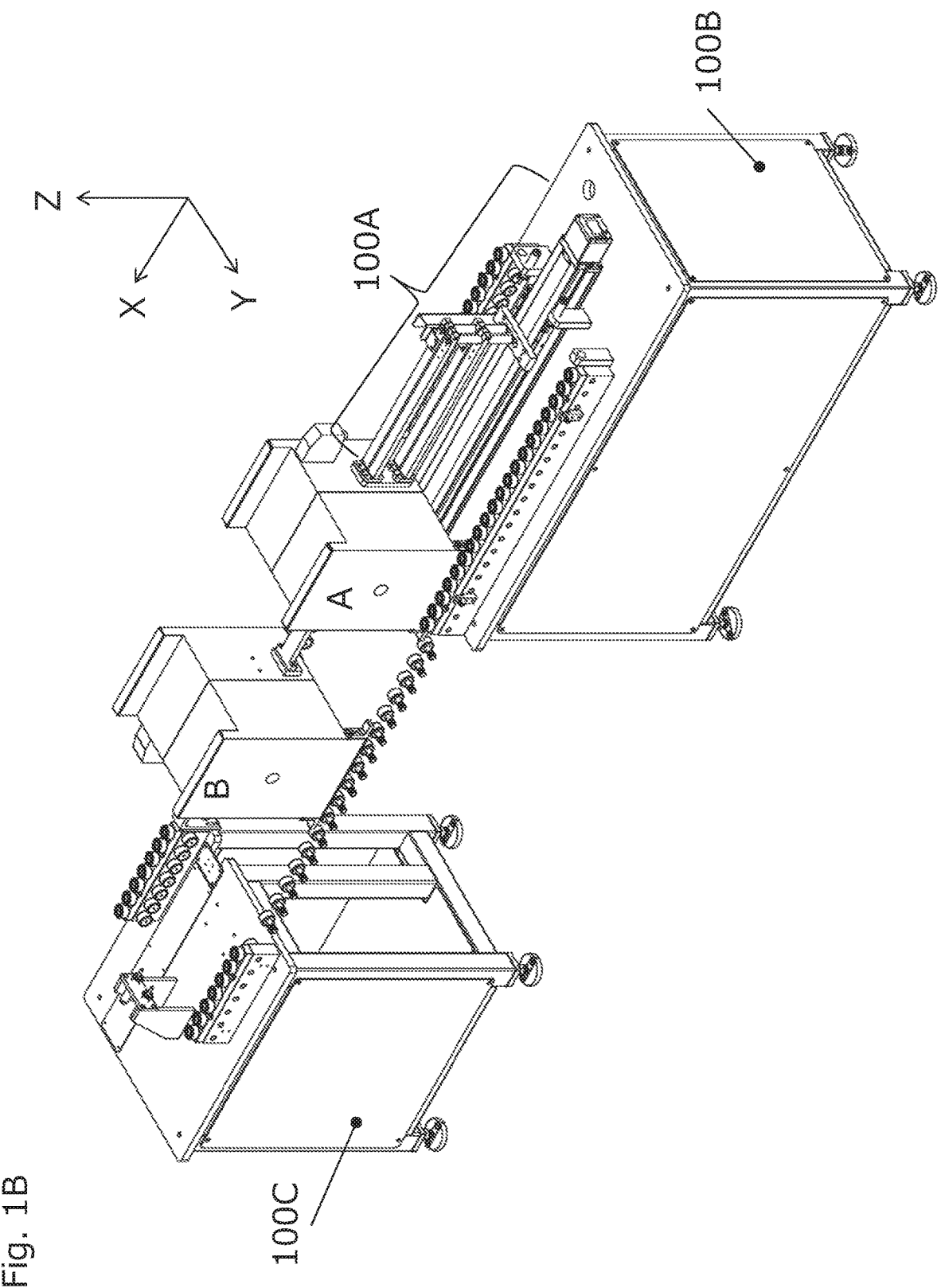

FIGS. 1A, 1B, and 1C illustrate an injection molding machine according to an exemplary embodiment. The injection molding machine performs injection molding by injecting resin into die (mold). Also, not limited to resin, it is applicable to materials such as wax or metal. FIG. 1A illustrates the overall injection molding machine 600 according to the exemplary embodiment. FIG. 1B illustrates conveyor apparatuses to be installed with the injection molding machine 600, and FIG. 1C illustrates a drive unit 100A and dies A and B.

The injection molding system illustrated in FIGS. 1B and 1C includes a drive unit 100A, a table unit 100B (base frame) and a table unit 100C (base frame). The drive unit 100A moves the two linked dies A and B. The table unit 100B guides the two linked dies, and the table unit 100C also guides the two linked dies. In this embodiment, the table unit 100B does not include a drive unit. The table unit 100B and the table unit 100C support two dies, and the two dies are moved along a supporting plane, which is a top panel of the table unit 100B and the table unit 100C.

By combining the drive unit 100A to the table unit 100B, one of the two dies can alternate moving to single injection position. In other words, the drive unit 100A moves the die A into the injection molding machine 600 and the other die B moves out of the injection molding machine 600 to the table unit 100B. An injection position is a position inside the injection molding machine 600. That is, by moving dies with drive unit 100A, it can switch the die positioned to the injection position inside the injection molding machine 600.

Details of the drive unit 100A to move the two linked dies is described with reference to FIG. 1C. The two dies A and B linked to drive unit 100A, mold A and mold B, is movable by drive of an actuator 10.

First, by a movable slide 32 for the actuator 10, die A that is linked to the slide 32, a plate 31 and a plate 20 become movable. And the actuator 10 itself and the table units 100B and 100C do not move according to the movement of dies A and B, because the actuator 10 is fixed to the table 100B. The dies A and B are movable with respect to the actuator 10 and the table units 100B and 100C. Hereinafter, the actuator 10 and the table unit 100B are referred collectively as a cart, and the table unit 100C is also referred as a cart.

Also, the die B is linked to the die A by a linking unit 40, and by movement of the die A also moves the die B along a moving direction of the die A. That is, if the die A moves in X axis positive direction in FIG. 1C, the die B also moves in X axis positive direction.

Also, the above mentioned configurations of the linking unit 20 and 40 will be later described in detail with reference to FIG. 3.

Figure 2:
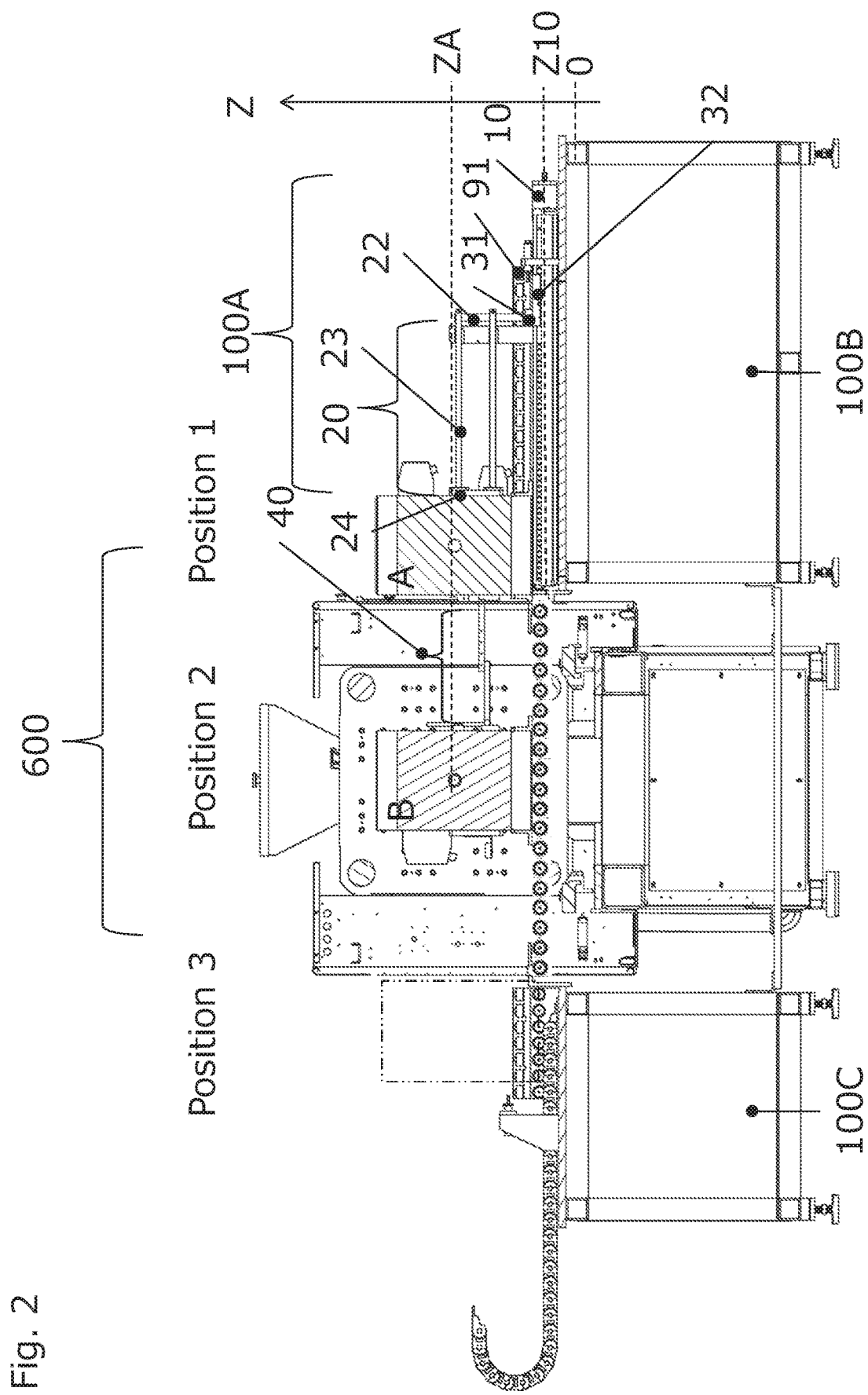
FIG. 2 is a side view of the injection molding machine.

Next, FIG. 2 explains about the movement of the die A and the die B. FIG. 2 is a side view of the injection molding machine 600, the die A, the die B, the drive unit 100A, the table unit 100B, the table unit 100C, and the linking units 20 and 40. In FIG. 2, will explain possible positions of dies are illustrated as positions 1, 2, and 3. The position 2 is an injection position of injection molding machine 600, and when a die is in the position 2, the injection molding machine 600 is able to inject resin into the die and to remove a molded part of the die. The positions 1 and 3 are cooling positions for cooling the dies A and B. By alternatingly moving the two dies into the injection position, and by enabling injection of resin, while one die is cooling, one die can have resin injected at the position 2, while the other die is being cooled at the position 1 or 3.

Figure 3A:
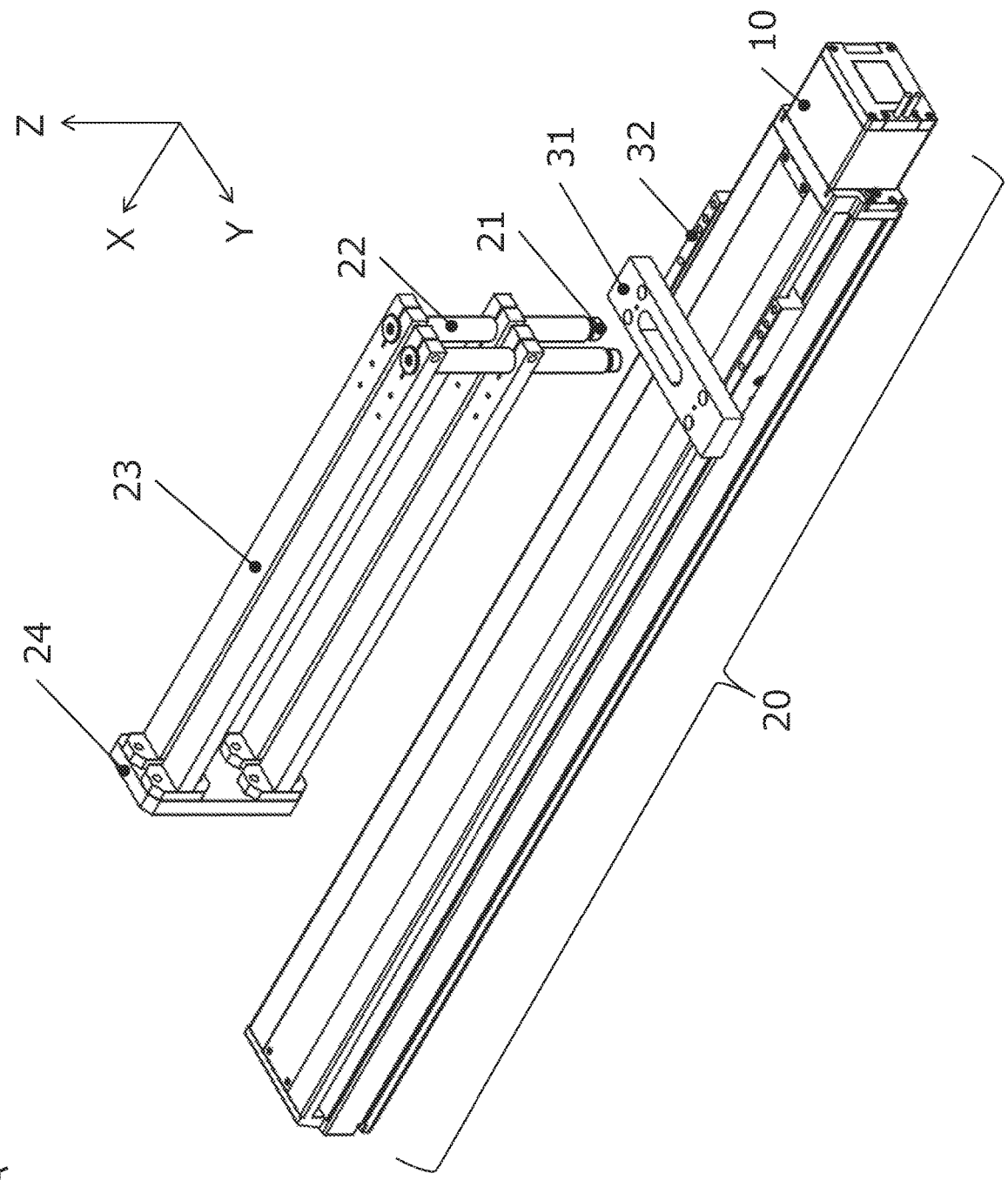
Figure 3B:
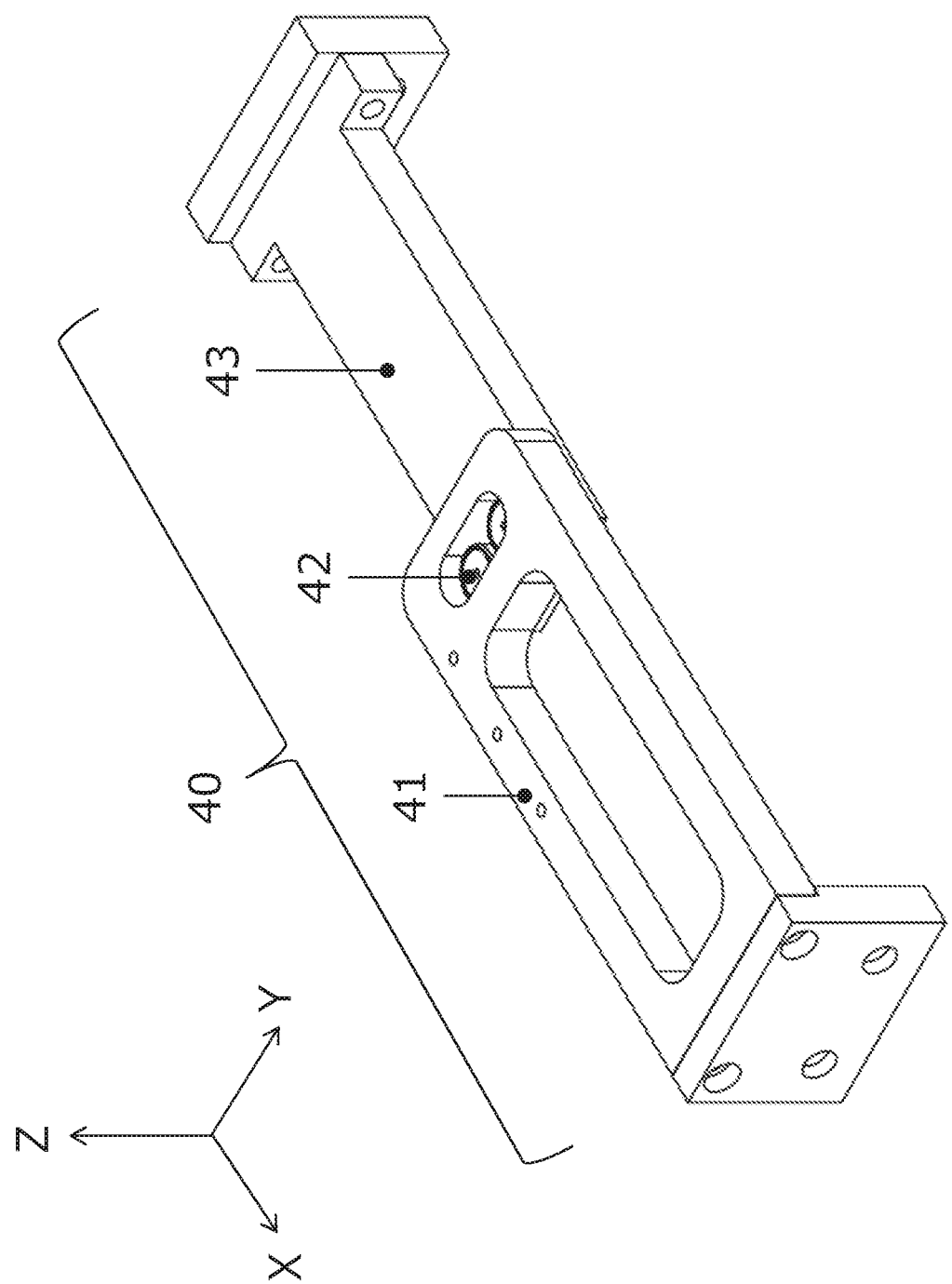

FIGS. 3A and 3B illustrate detail structures of the linking unit 20 (a connection point, a connection part, an actuator-mold connection part or a joint) and the linking unit 40 (a connection point, a connection part, a mold-mold connection part, or a joint). With reference to FIGS. 3A and B the configuration of linking unit 20 and 40 are described.

<Linking Unit Between a Mold and an Actuator>

FIG. 3A illustrates the linking unit 20 between the die A and the actuator 10. The linking unit 20 includes a base plate 24 to be attached to the die A, four linking brackets 23, and two shafts 22 fixed with the linking brackets 23. The two shafts 22 includes a cam follower 21 on tips. As described above, the base plate 31 includes a slot and is fixed to the slider 32 on the actuator 10. The cam follower 21 is inserted into the slot of the base plate, which makes the die A and the actuator 10 linked with each other.

Even when the dies or rollers (side surface guide roller 91, bottom surface guide roller 92) (wheel, rotation unit) are similar in shape, it does not mean the shape completely matches. Also, there are times different dies are used in molding. Therefore size and shape of die A and die B can be different, and a gap between rollers on width direction of die (Y axis direction), and the height of rollers below molds can also be different. Even more, it can be difficult to match a path of the die on the table unit 100B and a path of the die on the table unit 100C with a path of the die in the injection molding machine 600 if the table units 100B and 100C and the injection molding machine 600 are manufactured separately and then assembled. In order words, the positions of the carts on both sides of the injection molding machine and the position of the injection molding machine can be misaligned.

Even with a subtle difference in die shape and little difference in roller height, when heavy goods such as die A and die B move simultaneously, a large load is generated to the linking unit due to the misalignment. Specifically, regarding the linking unit, if moving direction of a die is X axis direction, load is generated in Y axis direction and Z axis direction. The load will be applied to the linking unit every time die moves, and the possibility of damage to the linking unit increases. Or unexpected load can be applied on the actuator and can cause damage.

This exemplary embodiment is related to the linking unit between two dies moving along by rollers' rotation, or between one die and the actuator fixed to the table unit 100B. When roller size or die size differs, even without precise accuracy to roller size or height between the cart and the injection molding machine can decrease some load by using the linking unit on this embodiment.

The following describes a situation when the dies A and B are moved in X axis direction, and when the center position of the actuator 10 in Y axis direction and the center position of the die A in Y axis direction are misaligned in Y axis direction. In other words, the following describes a situation when the center position of the die A in Y axis direction is misaligned against the center position of the actuator 10 in Y axis direction according to the movement of the die A or the die B. If the position of the die A and the position of the actuator 10 are misaligned in Y axis direction when the die A moves, due to the cam follower 21 with slippage of the linking bracket 23 moving along the inserted slot of base plate 31 in Y axis direction, this shift of the can follower 21 in Y axis direction can absorb the load generated by the misalignment of the positions of the actuator 10 and the die A in Y axis direction. That is, according to the movement of the die A in Y axis direction, the cam follower 21 rotates, and it can reduce the load applied to the actuator 10 and the linking unit. Generally the larger the misalignment of the positions of the die A and the actuator 10 in Y axis direction becomes, the larger the load applied to the linking unit and the actuator 10 becomes. Therefore, by reducing the shift towards Y axis direction, it can reduce or eliminate the load.

Without the linking unit 20 mechanism, and if simply linked with a rigid connection part, the center position of the die A in axis direction misaligns to the center position of the actuator 10 in Y axis direction, the weight of die A and the load from amount of movement portion towards Y axis direction applies to actuator 10 and linked section. Therefore the linked section warps towards Y axis direction, and additionally load is also applied to the actuator 10 in Y axis direction. By adopting the linking unit as illustrated in FIG. 3A, the cam follower 21 will be movable in Y axis direction against the base plate 31, and load from die A to shift towards Y axis direction to be applied to the linking unit 20 and the actuator will be reduced or even eliminated.

Also, in FIG. 2, the center position of the actuator 10 in Z axis direction is illustrated as Z10, and the center position of the die A in Z axis direction is illustrated as ZA. At this time, as illustrated in FIG. 2, the origin of Z axis is at the surface of table unit 100B. Because the actuator 10 is fixed to table 100B, if center of Z axis direction for actuator 10 is Z10 (datum position), and the center of the die A in Z axis direction is ZA (datum position), the actuator 10 and the die A are not misaligned in Z axis direction.

The following describes a situation when the dies A, B are moved in X axis direction, and when center position of the die A in Z axis direction misaligns in Z axis direction from ZA. When the die A moves, and if the datum position of Z axis direction for the actuator 10 and the datum position of Z axis direction for the die A changes, in other words, when the center position of Z axis direction for the die A misaligns in Z axis direction, the cam follower 21 of the linking brackets 23 that is inserted into slot of the base plate 31, will move along the slot in Z axis direction.

This cam follower's 21 shift in Z axis direction can absorb the load from misalignment to Z axis direction to be applied to the die A and the actuator 10. The cam follower 21 has slippage, so it is movable along Z axis direction of the slot. From this, same as Y axis direction shift, load applied to the actuator 10 and the linking unit 20 can be reduced or even eliminated.

Without the linking unit 20 mechanism, and if the actuator 10 and the die A are simply linked with a rigid connection part which does not have a pair of parts (as illustrated in FIG. 3) capable of shifting with respect to each other in both Y and Z direction, the center position of the die A in Z axis direction misaligns in Z axis direction from ZA, the weight of die A and the load from amount of movement portion towards Z axis direction applies to the actuator 10 and the linking unit 20. Therefore, the linking unit 20 may warp towards Z axis direction, and additionally load is applied to the actuator 10 in Z axis direction. By adopting linking unit as illustrated in FIG. 3A, the cam follower 21 is movable in Z axis direction, and load from die A shifting towards Y axis direction to be applied to the linking unit 20 and the actuator 10 will be reduced or even eliminated.

As mentioned above, the linking unit 20 includes two cam followers 21 and a slot on the base plate 31. By doing so, load from misalignment in both Z direction and Y direction to be applied to the die and actuator is reduced. Therefore, the configuration prevents applying excess load to the actuator 10, and reduce the possibility of damage to the linking unit, moreover, reduce the load to the actuator 10. As well as preventing damage to the actuator 10, it can reduce the cost of the injection molding system by enabling the manufacturer to adopt a relatively smaller actuator, and the system does not need to have a larger actuator which is tolerant to loads in directions different from its operating direction. Also by adopting this configuration, the manufacturing processes of the injection molding system may not need excessive position adjustment procedures for table unit 100B or excessive procedures to increase position accuracy of side surface guide rollers 91, bottom surface guide rollers 92 to the injection molding machine 600, which reduces cost by simplifying the manufacturing processes.

The cam follower 21 is shaped with slippage, for example it can be a round shape without rotating mechanism or can be a square shape. Slippage here means, against the surface inside slotted hole, its movable with low friction coefficient. Here, the slot is not limited to the hole, and the base plate 31 can have a groove instead of the hole. Also, the linking unit 20 according to above exemplary embodiment has four linking brackets 23, but the linking unit according to another exemplary embodiment can include a different number of the linking brackets with other shapes. Also, it is possible to use one or more shaft 22 and cam follower 21. Again, as far as the cam follower 21 and the slot of the base plate 31 are engaged to transmit force from the actuator 10 to the die A and are movable with respect to each other in directions different from the direction of the force, the cam follower 21 and the base plate 31 can have different configurations. For example the base plate can include cam followers which are engaged with a slot formed on a part fixed to the linking brackets. Further, regarding the configuration of above mentioned linking unit 20, view from XZ surface direction of FIG. 9A will be used.

Figure 9:
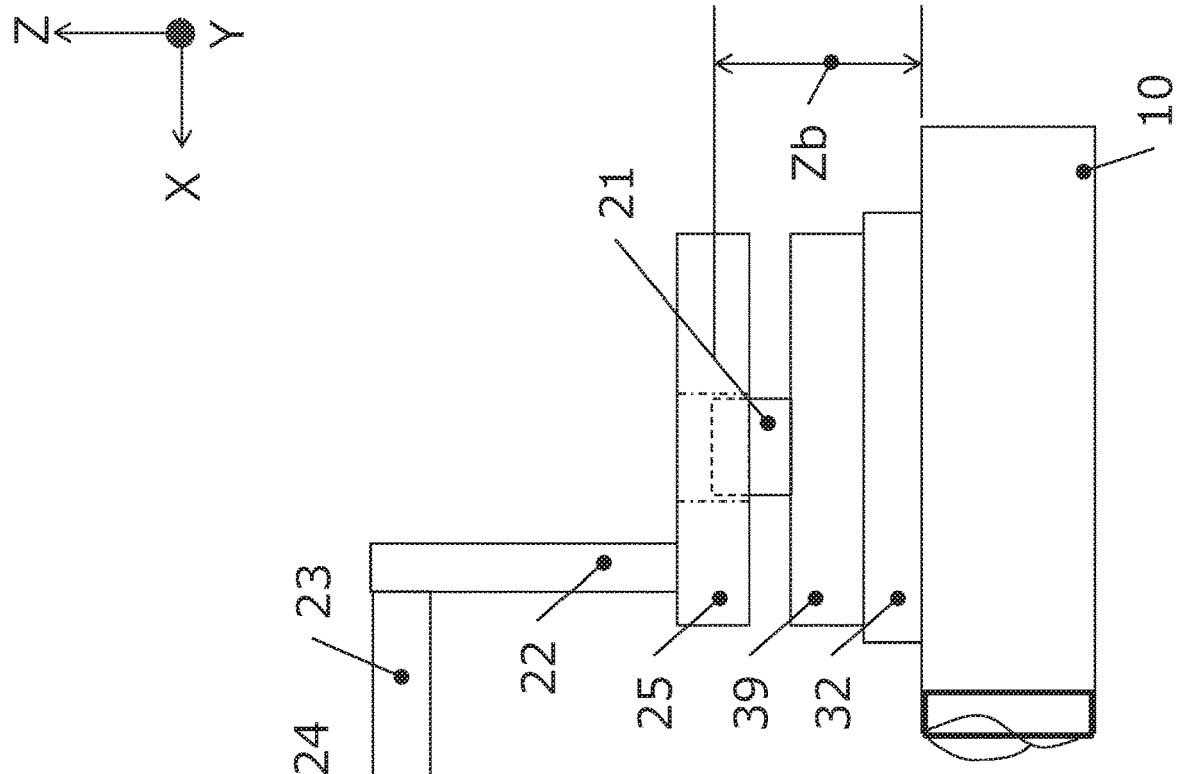
FIG. 9 (FIG. 9A and FIG. 9B) are side views of the linking unit according to the first embodiment.

FIG. 9A-B shows linking unit 20 for die A and actuator 10. For actuator 10, direct acting type actuator slide type is used, and placed below dies A, B in Z axis direction, and by overlapping movable range of dies A. B in X axis direction and overall length range of actuator 10, it can make overall machine compact size. Also, using one driving source simplifies machine mechanism, and number of parts for machine could be less which makes the machine cost cheaper. Also, actuator 10 is installable outside injection molding machine 600, the maintenance on actuator 10 is easily performed.

FIGS. 9A and 9B are both depicting the linking actuator 10 and the linking unit 20, but the distance of Z axis direction from linked position of the linking unit 20 side and actuator 10 side to the actuator 10 differs.

In FIG. 9A, the slider 32 is mounted on the actuator 10, and the plate 31 with the slot is mounted on the slider 32. On the other side, fixed section of die A has base plate 24, linked plate 23 and shaft 22 is assembled, and cam follower which is rotating body is attached to the tip of shaft 22, and then the cam follower 21 is inserted into the slot of plate 31. By moving slider 32 of actuator 10 in X axis direction, die A moves.

It is easier to push when base plate 24 is mounted on negative side of Z axis direction from center of die A. Also it is easier to push when base plate is mounted close as possible to center of Y axis direction of die A. But the die separates to movable and stationary parts in the Y axis direction, if the movable and stationary parts are split in center of die, it cannot mount base plate 24 in the center of Y axis direction of die A. When mounting base plate 24 to stationary parts, will be better to mount close as possible to movable die in the Y axis direction.

By moving die A, moving force and stopping force of die A is necessary positive and negative direction of X axis, and the momentum from working point of cam follower 21 and plate 31 becomes load to actuator 10. Reducing the load from the momentum is important to prevent breakdown of actuator 10.

The length of momentum is the distance from when bottom edge of cam follower contacts the slot on plate 31 to the top surface of actuator, and is important to reduce this distance Za. In the configuration shown in FIG. 9A, it fastens slotted plate 31 to actuator 10 side, and by fastening cam follower to die A side to reduce distance Za as much as possible, reduces the momentum and reduces the load to actuator 10.

Next, FIG. 9B will explain when cam follower 21 is mounted on actuator 10 side, and slotted plate 25 is on die A side. To mount cam follower 21 to actuator 10 side, it will need to mount plate 39 to slider 32 for the cam follower 21, and then mount the cam follower 21 to the plate 39. Also, slotted plate 25 will be attached to the bottom tip of shaft 22, and cam follower 21 is inserted, by actuator 10 moving to X axis direction, die A can move. Either configuration of FIG. 9A or configuration shown in FIG. 9B, it is applicable as the linking unit of this embodiment.

In the case of FIG. 9B, distance of momentum to actuator 10 becomes distance Zb, and this distance Zb is longer compared to distance Za from FIG. 9A for the portion of plate 39 which increases the momentum, and the load to actuator 10 is larger than the configuration of FIG. 9A.

<Linking Unit Between Molds>

In this exemplary embodiment, the dies A and B are linked with the similar pair of parts, to those adopted between the die A and the actuator, engaged with each other and movable with respect to each other in Y and Z directions (directions different than a moving direction of the dies A and B). A cam follower can be attached to a linking bracket to be attached to a die, and a slot can be formed on a linking bracket to be fixed to the other die, in order to enable both the engagement and the movability.

A linking unit 40 for die A and die B is illustrated in FIG. 3B. The linking unit 40 includes a linking bracket 41 with slot that is attached to die A and a linking bracket 43 that is attached to die B. Two cam followers 42 are connected to the tip of linking bracket 43, and the die A and the die B is linked by inserting the cam follower 42 into the slot of the linking bracket 41. The linking unit 40 includes 2 parts.

The linking unit 40 between the die A and the die B is similar to the linking unit 20, and is movable towards the other part. The linking unit 40 also has a structure preventing the linking unit 40 from warping, which can be caused by misalignment occurring between the dies to either Y axis direction or Z axis direction, when the die moves in X-direction. Also, by the die A shifting to Y axis direction or Z axis direction, due to misalignment between the position of the die A and the die B, the linking bracket 41 shifts against linking bracket 43.

One of the linking brackets' shifting may also cause a shift of the other linking bracket, but the amount of the shift of the other linking bracket can be at least reduced, compared to a configuration of a rigid connection between two dies.

When the die A and the die B are moving and if one of the positions of the die A and the die B shifts towards Y axis direction, the cam follower 42 of the linking bracket 43 inserted into the slot of the linking bracket 41 moves along the slot in Y axis direction, which can absorb the load generated from misalignment of the dies A and B applied to the die A and the die B in Y axis direction (FIG. 6A. FIG. 6B, FIG. 6C). Also if die A and die B move and the positions of the die A and the die B misaligns with each other in Z axis direction, the cam follower 42 of the linking bracket 43 inserted into the slot of the linking bracket 41 moves along the slot in Z axis direction, which can absorb the load generated from misalignment of the dies A and B applied to the die A and the die B in Z axis direction (FIG. 7A, FIG. 7B).

Moreover, the die A linked to the die B is also linked to the actuator 10, load applied to the actuator 10 and the linking unit 20 generated from shifting of the die B towards Y axis direction or Z axis direction can also be reduced.

It may be good that the cam follower 42 has slippage, but for the above mentioned examples, the cam follower 42 can have a rotatable mechanism along Y axis or Z axis. Also, there is two cam followers illustrated in FIG. 3B, but the number of the cam follower is not limited to 2 and can be one, or 3 or more. Also, when the linking bracket 41 and the linking bracket 43 can be shifted with each other in Z direction, as long as the cam follower 42 is engaged with the slot. Further when the linking bracket 41 and the linking bracket 43 shifts in Z axis direction, it may be good that there is a gap between the lower surface of the linking bracket 41 and the upper surface of the linking bracket 43 (length 'X' illustrated in FIG. 3C) and it may be good that the gap is large enough to prevent the linking brackets 41 and 43 from hitting with each other <Block Diagram and Flow Chart of Operation Process>

Figure 4:
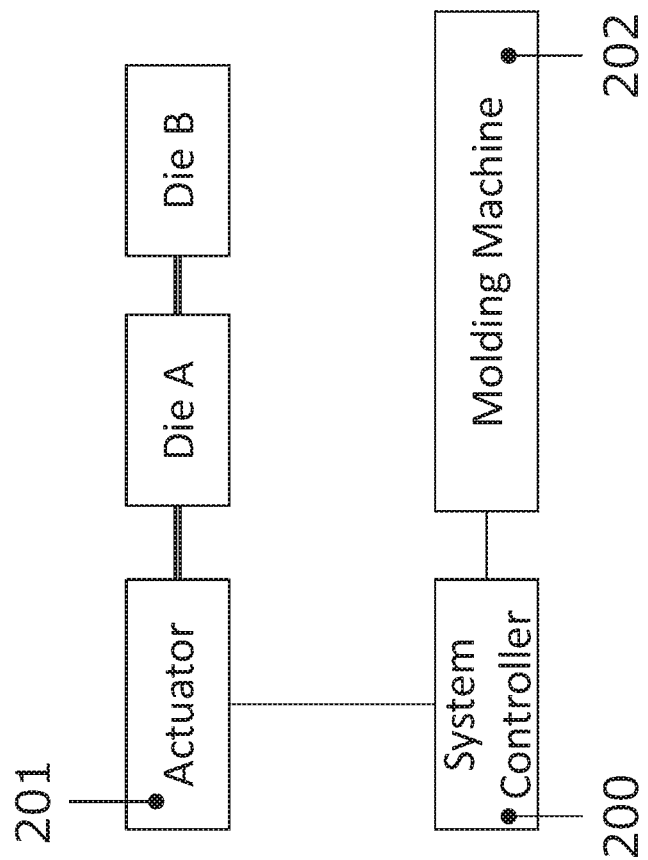
FIG. 4 is a block diagram of the injection molding machine.

FIG. 4 illustrates a block diagram of an injection molding system with 2 dies, according to an exemplary embodiment. The injection molding system includes a System Controller 200 that controls the overall system, an actuator 201 that moves a die A and a die B, and an injection molding machine 202. The actuator 201 corresponds to the actuator 10 described above and illustrated in FIG. 3, and the injection molding machine 202 corresponds to the injection molding machine 600 as illustrated in FIG. 1.

Figure 5:
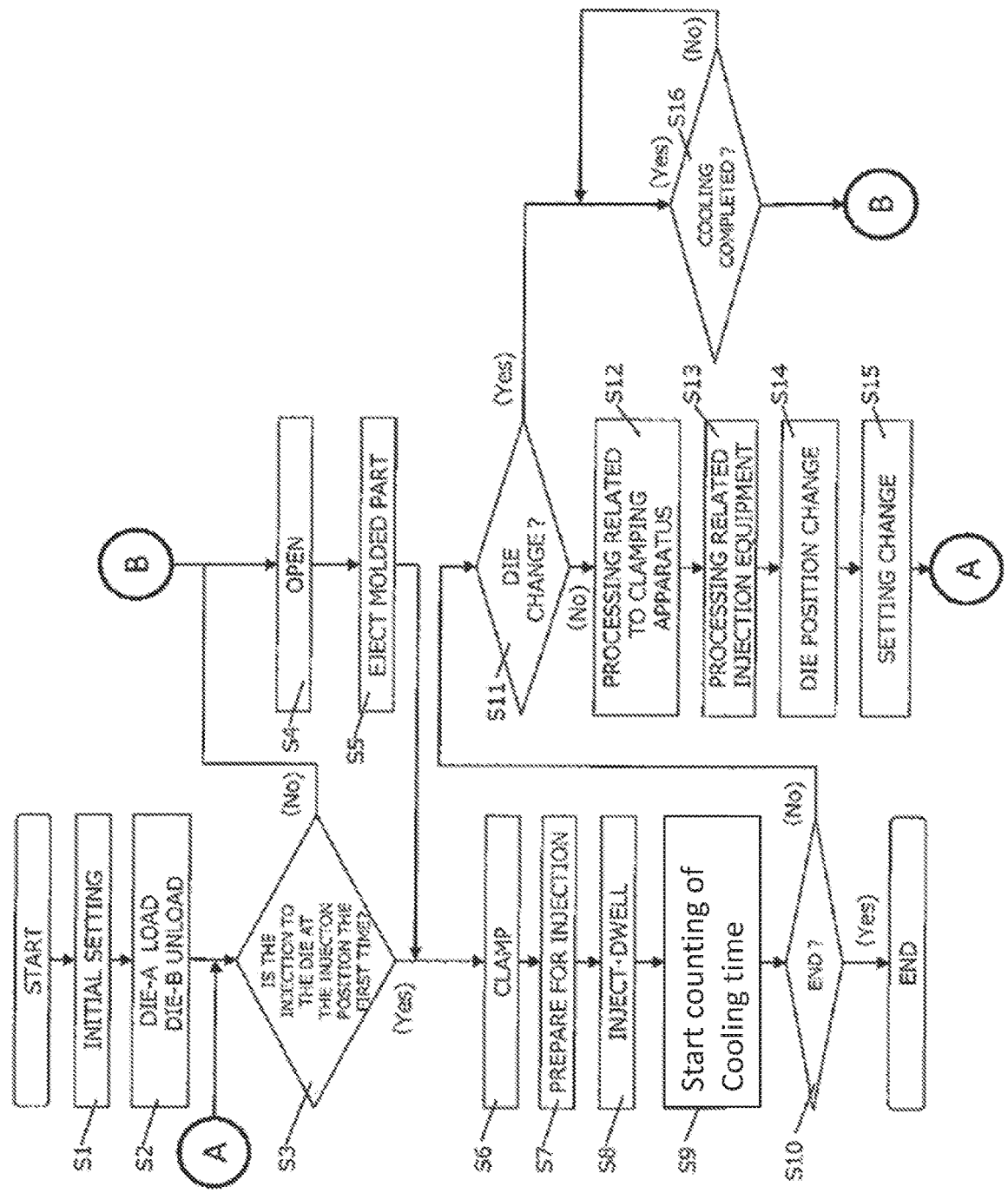
FIG. 5 is a flow chart of operation process for injection molding machine.

FIG. 5 illustrates a flow diagram of an operation process for the injection molding system, according to an exemplary embodiment. The operation process is described with reference to FIG. 5. The flow diagram in FIG. 5 illustrates that the operation process starts when power is on for the injection molding machine 202 and when the die A is at position 1, and the die B is at position 2, but it is not limited to that condition. The position 1 and the position 2 are both illustrated in FIG. 2.

In step S1, the System Controller 200 reads initial setting information, which may be entered by the operator. In the initial setting, for example, includes a cooling time for die or the number of molded parts to be generated with each of the dies. The cooling time can be entered by user, or, depending on the characteristic of the die and resin, the injection molding machine 202 or the system controller 200 can calculate the necessary cooling time based on previously entered information.

In step S2, the System Controller 200 controls the actuator 10 so that the die A moves to the injection position (position 2) and the die B to cooling position (position 3). The actuator 10 moves the die A from the position 1 to the position 2, and moves the die B from the position 2 to the position 3. For example, The actuator 10 first moves the die A to the injection position, then the injection molding machine 202 injects resin into the die, then after injecting resin, the actuator 10 moves the die A out of the injection position, and simultaneously moves die B to the injection position. This way, while die A and resin is being cooled at the position 1, the die B can have resin injected at the position 2. At this time, the linking unit 20 for the die A and the actuator 10 and the linking unit 40 for the die A and the die B include the cam followers 42 and 21 with slippage and the plates (the base plate 31 and the linking bracket 41) with slots, so the load from misalignment as mentioned above applied to the actuator 10, the linking units and the dies can be reduced.

In step S3, the System Controller 200 determines if the injection to the die in the injection position is the first time for the die or not. If determined that injection to the mold in injection position is the first time, the process proceeds to S6, and if not, the process proceeds to S4.

In step S4, if the System Controller 200 determines in step S3 the injection to the die positioned at the injection position in step S2 is not the first time, (in other words, the process proceeds to S3 from S15 later described,) the system controller 200 controls injection molding machine 202 to open the die. The die can be opened by the clamps appertain to platens of a stationary and a movable side of the injection molding machine 202 and fixing those platens with the die, and by moving the movable side platen backward (+Y direction) the die is opened. Also by opening the die, the injection molding machine 202 takes out the molded parts from the die, in the next S5 process.

In step S5, the System Controller 200 controls the injection molding machine 202 to take out the molded part out of the open die. As for molded parts, an auto hand attached to injection molding machine enters into the gap between a stationary side die (fixed mold, fix part or fix mold) and a movable side die (movable mold, move part or move mold) created by opening the die, then the auto hand holds the molded part by vacuum suction or grabbing the molded part, takes out, and places it on a specified table or on a belt conveyor. Specifically after the cooling process of the die A and the injected resin is completed at the position 1, the die A is moved to the injection position (the position 2), and the die is opened and the molded part is taken out, the injection molding machine 202 can inject resin into the die A again. Further, after the cooling process of the die B and the injected resin has been completed, the die B is moved to the injection position, and the injection molding machine 202 takes out a molded part. This way, while one of the die and the resin injected in the die are being cooled, the injection molding machine 202 injects resin into the other. In other words, from after injecting resin into one of the die to the taking out molded parts, without leaving the die in the injection position to cool off the die and resin, the injection molding machine 202 can inject resin into the other die, so the injection molding system can efficiently complete the cycle of injecting resin into die, cooling, and taking out of the molded part.

In step S6, the System Controller 200 controls injection molding machine 202 to clamp the die, if in step S3 it is determined that the injection to the die positioned at the injection position in step S2 is the first time (in other words, the process proceeds to S3 directly from S2), or the process proceeds to S6 from S5. For clamping the die, the injection molding machine 202 closes platen on a movable side of injection molding machine 202, then after the movable side die and stationary side die contact with each other, the clamping mechanism of injection molding machine 202 clamps the die.

In step S7, the System Controller 200 controls the injection molding machine 202 to make an injection nozzle into contact with the die to prepare for resin injection. Before moving forward the injection nozzle to the die, the system controller 200 confirms that the stationary side platen and the stationary side die are clamped together. After moving forward the injection nozzle, the system controller 200 confirms the contact between the injection nozzle and the stationary side die to check if the injection molding machine 202 is able to inject resin into the die.

In step S8, the System Controller 200 controls the injection molding machine 202 to inject resin in to the die and to keep pressure inside the die. Specifically, by following the molding conditions for the die A, which is previously saved on injection molding machine, the injection molding machine 202 performs the injection process of injecting resin from the injection nozzle, and then performs pressure holding process to keep pressure applied to the resin from injection nozzle.

In step S9, the System Controller 200 starts counting cooling time. The cooling time is counted by a timer circuit, and the system controller 200 checks if a predetermined period of cooling time passes, based on the molding condition for die A, which is previously saved on the injection molding machine. The cooling time is for example about 10 sec if the resin is ABS, thickness of the molded part is about 2.0 mm and the molded part is about the size of printer exterior parts, and about 5 sec if resin is PS, the thickness of the molded part is about 1.0 mm and the molded part is about the size of toner cartridge of a printer. But the cooling time varies depending on resin quality, temperature and shape.

In step S10, the System Controller 200 determines if an operation in the injection molding machine is completed or not. The operation ends, for example, when the number of the molded parts reaches the predetermined number set by user, or power is turned off for the injection molding system 100. If a predetermined operation has been completed, then the process ends, and otherwise the process proceeds to S11.

In step S11, the System Controller 200 determines if the die A and the die B should be moved. Moving of the dies A and B will occur if a previously saved cooling time (hereinafter Tb_in) for the die B, during which the die B is cooled in the injection position is less than twice of previously saved cooling time (hereinafter Ta_in) for the die A, during which the die A is cooled in the injection position, but the moving will not occur if Tb_in is twice or more of Ta_in. Switching the die after injecting resin does not occur when Tb_in is twice or more than Ta_in. On the other hand if that is not the case, the actuator 10 moves the die A to the position 1, and moves the die B to the position 2. If it is determined to move positions of dies A and B in S11, the process proceeds to S12. If not, the process proceeds to S16.

In step S12, the System Controller 200 controls the injection molding machine 202 to open up a little to make the die movable. In this step the injection molding machine 202 releases the clamps attained on platens of the stationary side and the movable side from dies, and by giving a small opening about 5 mm, for example, on the movable side platen to make the die movable. The amount of the small opening can be changeable to any of the conditions, as far as the die is movable.

In step S13, the System Controller 200 controls injection molding machine 202 to move back the injection nozzle about 10 mm, for example, to make the die movable. This step is to prevent damage to the die and the injection nozzle due to interference between the die and the injection nozzle while the dies are being changed. The amount of the injection nozzle's moving back can be set to any range as far as the interference between die and injection nozzle is avoided.

In step S14, the System Controller 200 controls the actuator 10 so that the die A moves to the injection position (position 2) and the die B moves to the cooling position (position 3), if the die B has been at the injection position since the previous steps S3. If the die A has been at the injection position, on the other hand, the actuator 10 moves the die A from the position 2 to the position 1, and moves the die B from the position 3 to the position 2. During the change of dies, because the linking unit 20 for the die A and the actuator 10 and, the linking unit 40 for the die A and the die B include parts with slippage and plates with slot, the load from misalignment as mentioned above to the actuator 10, the linking units and the dies can be reduced.

In step S15, the System Controller 200 changes setting to the condition set for the die in the position 2. The condition set for the die B, for example, applying to the die B is loaded from a memory of the system controller 200 or the injection molding machine 202. If in step S14 the die in the position 2 is changed from the die A to the die B, the system controller 200 changes from the settings for the die A to the settings for the die B. The system controller 200 changes settings such as injection condition, holding pressure, and cooling condition.

In step S16, the System Controller 200 determines if the cooling time has elapsed or not, to check if the cooling process is completed or not. If it is determined that the cooling is completed, the process proceeds to S4, if not, the system controller 200 waits until cooling time elapses.

This way, the injection molding system according to the above exemplary embodiment makes it possible to move two dies with a single actuator stably. In details, as mentioned previously, the linking unit 20 between the actuator 10 and the die A, and the linking unit 40 between the die A and the die B have parts with slippage and plates with slots, so even if load occurs in Y axis direction and Z axis direction from die A and die B movement, those linking mechanism can reduce the load due to the misalignment between the linking unit 20, the linking unit 40 and the actuator 10.

The linking unit in this embodiment includes the linking unit between two dies, or the linking unit between die and drive unit and is connecting a component on one side and a component on the other side. When misalignment may occur between the two sides, the component on the one side moves with respect to the component on the other side in the direction of misalignment. At this time, if the linking unit is simply a rigid metal part, misalignment would cause the metal part to warp and load will be applied to both the components. But by introducing a linking unit that includes a pair of parts which are movable with respected to each other to prevents the linking unit from warping, and prevent the linking unit from transferring the load generated from the misalignment of the components. As a result, a possibility of bend/bending of the linking unit and a possibility of damage of the actuator from the bending would be decreased or not occur.

Also if the cooling time differs greatly between die A and die B, a cycle of the die A and a cycle of the die B are different, the injection process can be performed twice or more for the die A, while the die B is being cooled on the table 100C. For example, it is possible to inject three times, cooling, and take out the die B during one injection and cooling the die A. In this way, when one die is being cooled, the other die can be injected, can be cooled a molded part can be taken out, and the other die can be injected again. So even when cooling time differs, efficiency in utilizing the injection molding machine is increased.

For above mentioned embodiment, it is described that the two dies are linked, but it is not limited to this. The linking unit 20 between the actuator 10 and the die A itself is effective without the linking unit 40 linking the die A and the die B.

Also, the configuration for linking unit 20 is not only for two dies A and B, but it is effective even in a situation if three or more dies are moved by the actuator 10. That is to say even if there were misalignment to cause load to apply to the actuator 10 in Y axis direction, Z axis direction in any of the dies, as long as linking unit linking between the actuator 10 and the die A is similar to above mentioned configuration of the linking unit 20, the applied load to the dies or the actuator 10 is reduced. At this time, even if the linking unit between dies is not similar to above mentioned configuration of the linking unit 40 and is simply rigidly fixed the two dies with each other, the applied load to the actuator 10 can be reduced.

Also regarding the linking unit between dies, not limited to above mentioned embodiment, if three or more molds exist, the above mentioned linking unit 40 can link between two of the dies.

Moreover, in a case that multiple dies are on a slider on an actuator and on a table unit, one actuator will move the multiple dies, and the injection molding machine can inject and mold efficiently and at lower cost. The injection molding system can move dies left and right of the injection mold machine by inserting the slider into injection mold machine.

Once more, in a situation of opening a die to take out a molded part, a move part of the die moves to the movable platen side while a fix part of the die stays with the stationary platen side. Therefore, the injection molding machine can take out a molded part by making the slider under the fix part of the die.

However, when the die is separated near its center, it does not have to consider the misalignment between dies, but the slider mechanism needs other mechanism than the mechanism that moves the dies left and right. Therefore, more than the above mentioned embodiment, machine configuration may become complicated, or increase the number of parts and cost may become higher.

Even more, in above mentioned embodiment, it explained example of die moving on roller lined in X axis direction, but even if the roller is attached to mold itself, and when moves among flat surface of table, above mentioned linking unit is also effective.

Also, according to another embodiment, one more plate can be added between the two base plates of linking unit, and make it rotatable in XY plane, XZ plane against the base plate. By doing so, if one of the die shifts towards Y axis direction, a middle plate moves in XY plane with the other die and the base plate's contact point as an axis. Therefore the other die does not need to move in Y axis direction. The detail structures of the linking units are described later with reference to FIGS. 10-14.

Also, by using the linking unit according to the above embodiments, even without high accuracy for position accuracy between the dies or position accuracy for the transfer rollers, it can reduce load applied to linking unit or the actuator when moving, so it can reduce cost for parts and eliminate adjustment process in the assembly process for high accuracy.

Again, the above mentioned embodiment describes the method of distributing loads generated from dies' misalignment, by the configuration of parts with slippage and plate with slot, but it is not limited to this. If the direction of multiple dies moves by the actuator is in X direction, it just needs to be a configuration that distributes load generated from misalignment to each die in Y axis direction and Z axis direction. For example, placing multiple mechanism of linear guided machine that will disperse load to Y axis direction and Z axis direction such as linear guide or shaft and bushing configuration. Apart from that, it can be a floating joint that can disperse load to Y axis direction, Z axis direction. Also, it can be established with bracket configuration such as FIG. 8.

FIG. 8 illustrates the configuration of the linking unit 40 according to another embodiment. The linking unit 40 illustrated in FIG. 8 includes the shaft 22, the linking bracket 41, the linking bracket 43, and a linking bracket 44.

In a case of FIG. 8A, the linking bracket 43 is connected with the actuator 10, and the shaft (protruding portion) 22 is connected with the linking bracket 43. A hole is formed in the linking bracket 41, and the shaft 22 is inserted into the hole. One end of the linking bracket 44 is connected with the linking bracket 41 and the other end of the linking bracket 44 is connected with the mold A. With this configuration, the linking unit 40 (the linking bracket 44) is connected with the mold A at a lower position in Z-direction, compared to the configuration illustrated in FIGS. 3B, 3C. Therefore, the linking unit 40 can transmit force from the actuator 10 to the mold A efficiently.

In a case of FIG. 8B, the linking bracket 43 and the linking bracket 44 are connected with the actuator 10 respectively, and the shaft 22 is connected with both the linking bracket 43 and the linking bracket 44. A hole is formed in the linking bracket 41, and the shaft 22 is inserted into the hole. The linking bracket 41 is connected with the mold A. The linking bracket 41 is located between the linking bracket 43 and the linking bracket 44. With this configuration, if the mold A and the linking bracket 41 moves in Z-direction largely, it can prevent the linking bracket 41 from slipping out of the shaft 22.

Note that the configuration illustrated in FIG. 8 may be adopted to not only the linking unit 40 but also the linking unit 20.

As explained above, according to before mentioned embodiment, by adapting the above configuration, one side of part of linking unit against the other part in the direction of misalignment, is movable by restricting warp, so it can restrict the load due to misalignment. Restricting warp mentioned here, of course does not mean to make warping to zero, but means compared to not using above configuration, can reduce warping.

While aspects of the present disclosure have been described with reference to exemplary embodiments, it is to be understood that aspects of the present disclosure are not limited to the disclosed exemplary embodiments.

Second Embodiment

<Configuration of the Linking Unit><

FIG. 10A is a top view of the linking unit 20, the linking unit 40 and the molds A and B, and FIG. 10B is a side view of the linking unit 20, the linking unit 40 and the molds A and B. FIG. 10C is a figure viewing the cross section A, shown in FIG. 10B, from the direction of the arrow, FIG. 10D is a figure viewing the cross section B, shown in FIG. 10B, from the direction of the arrow, and FIG. 10E is a figure showing the figure of the cross section C, shown in FIG. 10B, from the direction of the arrow respectively. In these figures, the floating joint 300a is fixated to the stationary mold 302a of the mold A, the linking bracket 344 is fixated to the stationary mold 302a of the mold A, and the floating joint 300b is fixated to the stationary mold 302b of the mold B. The stationary mold 302 here is a mold that does not move in the Y axis direction, and the movable mold 303 is the mold that moves in the Y axis direction inside the injection molding machine 600 when taking out the molded part.

Here, it is not always the case that the shapes of the molds and the rollers match perfectly due to individual variation. There are cases where molding is conducted using 2 molds of different shapes from each other. And, because it is difficult to align the positions of the table unit 100B or table unit 100C in respect to the injection molding machine 600, it is also difficult to align the positions of the rollers included in each piece of equipment.

This type of negligible shape difference of the molds generates misalignment when moving the mold A or the mold B due to the differences in the roller positions or height. Concretely, a load occurring in the Y axis direction, the Z axis direction, the θY direction, and the θZ direction is generated to the linking unit 20 or the linking unit 40. Especially, when performing the mold clamping motion with the injection molding machine 600, a large load is generated in the θZ direction. Here, the mold clamping is the motion of pushing the movable mold 303 against the stationary mold 302, and the motion of preparing to inject resin. In this exemplary embodiment, the floating joints 300a and 300b are installed to the linking unit 20 and the linking unit 40 respectively, considering this type of load.

Next, the details of the floating joints 300a and 300b will be explained. Because the configuration of the floating joints 300a and 300b are the same, it will be explained here taking the floating joint 300a as the embodiment. FIG. 11A is a top view of the floating joint 300a, FIG. 11B is a side view, and FIG. 11C shows a figure viewing the cross section D, shown in FIG. 11B, from the direction of the arrow.

First, as shown in FIG. 11A and FIG. 11B, the floating joint 300a is equipped with the pipe shaft 322b, which extends in the Z axis direction, and the pipe shaft 322a, which extends in the Y axis direction. The pipe shaft 322b is clamped in the Y axis direction by the 2 bolts 336b, and fixated against the block 323. The pipe shaft 322a is clamped in the Z axis direction by the 2 bolts 336a, and fixated against the block 323.

The plate 329 is fastened to the mold A. and the plate 327 is fastened to the linking bracket 343. As shown in FIG. 11C here, the positioning pin 330 and the positioning pin 331 are installed in the mold A. Open up a precision hole for the positioning pin 331 in the center of the plate 329, assemble the mold A and the plate 329 so this positioning pin 331 will fit into it, and rotate the plate 329 in the counter clockwise direction as shown in FIG. 11C. The plate 329 is fastened to the mold A with the 4 bolts 332-335 in the location where the plate 329 makes contact with the positioning pin 330.

The pipe shaft 322b is held on both ends by the 2 holders 325b, which have the oil-free bushings 321b inserted, and is able to move by sliding along the Z axis direction. The pipe shaft 322a is held on both ends by the 2 holders 325a, which have the oil-free bushings 321a inserted, and is able to move by sliding along the Y axis direction. The 2 holders 325b are fixated on the plate 329, and the 2 holders 325a are fixated on the plate 327. Furthermore, to improve the slidability of the pipe shaft 322b, the lid 326b is assembled to the holder 325b to seal it, and grease 328b is applied to the inner surface of the lid 326b. In the same manner the lid 326a is assembled to the holder 325a to seal it, and grease 328a is applied to the inner surface of the lid 326a.

Furthermore, because the pipe shaft 322b is not fixated against the holder 325b, it is possible for each part that is fixated on the plate 329 to rotate with the pipe shaft 322b as the axis. In other words, it is possible to rotate with the Z axis as the center. In the same manner, because the pipe shaft 322a is not fixated against the holder 325a, it is possible for each part that is fixated on the plate 327 to rotate with the pipe shaft 322a as the axis. In other words, it is possible to rotate with the Y axis as the center.

FIG. 12 (FIGS. 12A and 12B) is an enlarged view of the area 500 of FIG. 11A. There are 2 stop pins 324b assembled along the Y axis direction on the plate 329. There is a gap installed between the stop pins 324b and the block 323. The rotation (θZ), that takes the pipe shaft 322b as the center, is conducted in this gap, and the amount of rotation is controlled by the contacting of the stop pins 324b and the block 323. Furthermore, the amount of parallel motion in the Y axis direction is controlled by the contacting of the side panels of the block 323 and the holder 325a. Even if the block 323 moved parallel in the Y axis direction, it is possible for the block 323 to contact the stop pins 324b, if it is within the range of the amount of motion.

FIG. 12B is an enlarged view of the area 510 of FIG. 1B. There are 2 stop pins 324a assembled along the Z axis direction on the plate 327. There is a gap installed between the stop pins 324a and the block 323. The rotation (θY), that takes the pipe shaft 322a as the center, is conducted in this gap, and the amount of rotation is controlled by the contacting of the stop pins 324a and the block 323. Furthermore, the amount of parallel motion in the Z axis direction is controlled by the contacting of the side panels of the block 323 and the holder 325b. Even if the block 323 moved parallel in the Z axis direction, it is possible to for the block 323 to contact the stop pins 324a, if it is within the range of the amount of motion.

<Floating Joint Movement>

Next, the movement of the floating joint 300a will be explained in detail. FIGS. 13A-F indicate the state when the parts on the mold A side have rotated with the Z axis as the center and when the parts on the mold A side have moved parallel to the Y axis direction. FIGS. 14A-F indicate the state when the parts on the mold A side have rotated with the Y axis as the center and when the parts on the mold A side have moved parallel to the Z axis direction.

Using FIGS. 13A-F, explanation is given concerning when the center position in the Y axis direction of the mold A is misaligned in the +Y axis direction with respect to the center position in the Y axis direction of the actuator 10. The actuator 10 is located at a side of the linking bracket 343. When the positions of the mold A and the actuator 10 have misaligned in the Y axis direction during the movement of the mold A, the parts (the parts fixated to the plate 329) on the mold A side, including the pipe shaft 322a and the block 323, move in the +Y axis direction due to the fact that the pipe shaft 322a slides inside the holder 325a into which the oil-free bushing 321a has been inserted. With this, it becomes possible to absorb the load of the misalignment occurring in the Y axis direction of the actuator 10 and the mold A.

Using FIG. 13B, explanation is given concerning when the center position in the Y axis direction of the mold A is misaligned in the −Y axis direction with respect to the center position in the Y axis direction of the actuator 10. In this case, the parts on the mold A side including the pipe shaft 322a and the block 323 move in the −Y axis direction due to the pipe shaft 322a sliding inside the holder 325a into which the oil-free bushing 321a has been inserted. With this, it becomes possible to absorb the load of the misalignment in the Y axis direction of the actuator 10 and the mold A.

When the mold A has moved in the Y axis direction, it is ensured that the parts on the mold A side are able to move in the Y axis direction in respect to the parts on the actuator 10 side, via the pipe shaft 322a. As a result, it is possible to reduce the load to the actuator 10 and the linking unit 20. The greater the misalignment occurring in the Y axis direction of the mold A and the actuator 10 is, the greater the load that is applied to the linking unit 20 and the actuator 10 becomes, but according to the configuration of this exemplary embodiment, it is possible to reduce or completely eliminate the load that is applied.

If the mechanism of the linking unit 20 is not there, and it is simply linked by a rod shaped component, depending on the misalignment of the center in the Y axis direction of the mold A in the Y axis direction against the center in the Y axis direction of the actuator 10, the weight of the mold A and the load of the movement portion in the Y axis direction will be applied to the actuator 10 and the linking component. Therefore, the linking component will bend against the Y axis direction, and, in addition, the load in the Y axis direction will also be caused to be applied to the actuator 10. According to the mechanism of the linking unit 20 of this exemplary embodiment, it becomes possible for the mold A to move in the Y axis direction against the actuator 10, so the load to the linking unit 20 and the actuator 10 is reduced.

Using FIG. 13C, explanation is given concerning when the center position in the θZ axis direction of the mold A has misaligned in the +θZ axis direction with respect to the center position in the θZ axis direction of the actuator 10. If the positions of the mold A and the actuator 10 misaligned in the θZ axis direction during the mold clamping of the mold A, the parts (the parts fixated to the plate 329) on the mold A side will rotate in the +θZ axis direction via the pipe shaft 322b. As a result, it becomes possible to absorb the load of the misalignment in the θZ axis direction of the actuator 10 and the mold A.

Using FIG. 13D, explanation is given concerning when the center position in the θZ axis direction of the mold A has misaligned in the −θZ axis direction with respect to the center position in the θZ axis direction of the actuator 10. In this case, the parts on the mold A side will rotate in the −θZ axis direction via the pipe shaft 322b. As a result, it becomes possible to absorb the load of the misalignment in the θZ axis direction of the actuator 10 and the mold A.

When the mold A has moved in the θZ axis direction, it is ensured that the parts on the mold A side can move in the θZ axis direction with respect to the parts on the actuator 10 side via the pipe shaft 322b. As a result, it is possible to reduce the load to the actuator 10 and the linking unit 20. The greater the misalignment occurring in the θZ axis direction of the mold A and the actuator 10, the greater the load that will be applied to the linking unit 20 and the actuator 10 will become, but according to the configuration of this exemplary embodiment, it is possible to reduce or completely eliminate the load that is applied.

If the mechanism of the linking unit 20 is not there, and it is simply linked by a rod shaped component, depending on the center in the θZ axis direction of the mold A having shifted in the θZ axis direction with respect to the center of the θZ axis direction of the actuator, the load of the movement portion in the θZ axis direction of the mold A due to mold clamping will be applied to the actuator 10 and the linking component. Consequently, the linking component bends in the θZ axis direction, and, in addition, the load in the θZ axis direction will also be caused to be applied to the actuator 10. According to the linking unit 20 of this exemplary embodiment, it becomes possible for the mold A to move in the θZ axis direction against the actuator 10, so the load to the linking unit 20 and the actuator 10 will be reduced.

Using FIG. 13E, explanation is given concerning when the center position in the Y axis direction of the mold A has shifted in the +Y axis direction with respect to the center position in the Y axis direction of the actuator 10, and when the center position in the θZ axis direction of the mold A has shifted in the +θZ axis direction of the mold A with respect to the center position in the θZ axis direction of the actuator 10. In this case, the parts on the mold A side which includes the pipe shaft 322a and the block 323 will move in the +Y axis direction due to the pipe shaft 322a sliding inside the holder 325a into which the oil-free bushing 321a has been inserted. As a result, it becomes possible to absorb the load of the misalignment that occurs in the Y axis direction of the actuator 10 and the mold A. Furthermore, the parts on the mold A side will rotate in the +θZ axis direction via the pipe shaft 322b. As a result, it becomes possible to absorb the load of the misalignment that occurs in the θZ axis direction of the actuator 10 and the mold A.

Using FIG. 13F, explanation is given concerning when the center position in the Y axis direction of the mold A has shifted in the −Y axis direction with respect to the center position in the Y axis direction of the actuator 10, and when the center position in the θZ axis direction of the mold A has shifted in the −θZ axis direction with respect to the center position in the θZ axis direction of the actuator 10. In this case, the parts on the mold A side including the pipe shaft 322a and the block 323 will move in the −Y axis direction due to the pipe shaft 322a sliding inside the holder 325a into which the oil-free bushing 321a has been inserted. As a result, it will become possible to absorb the load of the misalignment that occurs in the Y axis direction of the actuator 10 and the mold A. Furthermore, the parts on the mold A side will rotate in the −θZ axis direction via the pipe shaft 322b. As a result, it becomes possible to absorb the load of the misalignment that occurs in the θZ axis direction of the actuator 10 and the mold A.

Using FIG. 14A, explanation is given concerning when the center position in the Z axis direction of the mold A has shifted in the −Z axis direction with respect to the center position in the Z axis direction of the actuator 10. In this case, the parts (parts fixated to the plate 329) on the mold A side will move in the −Z axis direction due to the pipe shaft 322b sliding inside the holder 325b into which the oil-free bushing 321b has been inserted. As a result, it becomes possible to absorb the load of the misalignment that occurs in the Z axis direction of the actuator 10 and the mold A.

Using FIG. 14B, explanation is given concerning when the center position in the Z axis direction of the mold A has shifted in the +Z axis direction with respect to the center position in the Z axis direction of the actuator 10. In this case, the parts on the mold A side will move in the −Z axis direction due to the pipe shaft 322b sliding inside the holder 325b into which the oil-free bushing 321b has been inserted. As a result, it becomes possible to absorb the load of the misalignment that occurs in the Z axis direction of the actuator 10 and the mold A.

Using FIG. 14C, explanation is given concerning when the center position in the θY axis direction of the mold A has shifted in the +θY axis direction with respect to the center position in the θY axis direction of the actuator 10. In this case, the parts (parts fixated on the plate 329) on the mold A side, which include the pipe shaft 322b and the block 323, will move in the +θY axis direction via the pipe shaft 322a. As a result it becomes possible to absorb the load of the misalignment in the θY axis direction of the actuator 10 and the mold A.

Using FIG. 14D, explanation is given concerning when the center position in the θY axis direction of the mold A has shifted in the −θY axis direction with respect to the center position in the −θY axis direction of the actuator 10. In this case, the parts on the mold A side including the pipe shaft 322b and the block 323 will rotate in the −θY axis direction via the pipe shaft 322a. As a result, it becomes possible to absorb the load of the misalignment in the θY axis direction of the actuator 10.

Using FIG. 14E, explanation is given concerning when the center position in the Z axis direction of the mold A has shifted in the −Z axis direction with respect to the center position in the Z axis direction of the actuator 10, and when the center position in the in the θY axis direction of the mold A has shifted in the +θY axis direction with respect to the center position in the θY axis direction of the actuator 10. In this case, the parts on the mold A side will move in the −Z axis direction due to the pipe shaft 322b sliding inside of the holder 325b into which the oil-free bushing 321b has been inserted. As a result, it becomes possible to absorb the load of the misalignment in the Z axis direction of the actuator 10 and the mold A. Furthermore, the parts on the mold A side including the pipe shaft 322b and the block 323 will rotate in the +θY axis direction via the pipe shaft 322a. As a result, it becomes possible to absorb the load of the misalignment in the θY axis direction of the actuator 10 and the mold A.

Using FIG. 14F, explanation is given concerning when the center position in the Z axis direction of the mold A has shifted in the −Z axis direction with respect to the center position in the Z axis direction of the actuator 10, and when the center position in the θY axis direction of the mold A has shifted in the −θZ axis direction with respect to the center position in the θY axis direction of the actuator 10. In this case, the parts on the mold A side will move in the −Z axis direction due to the pipe shaft 322b sliding inside the holder 325b into which the oil-free bushing 321b has been inserted. As a result, it becomes possible to absorb the load of the misalignment in the Z axis direction of the actuator 10 and the mold A. Furthermore, the parts on the mold A side including the pipe shaft 322b and the block 323 will rotate in the −θY axis direction via the pipe shaft 322a. As a result, it becomes possible to absorb the load of the misalignment in the θY axis direction of the actuator 10 and the mold A.

As described above, the configuration is such that the parts that fasten the pipe shafts 322a and 322b with the block 323 can slide in each of the Y axis, Z axis, θY axis, and θZ axis directions inside of the holders 325a and 325b into which the oil-free bushings 321a and 321b have been inserted. As a result, it is possible to reduce the load of the misalignment of the mold A and the actuator 10 in the Y axis, the Z axis, the θY axis, and the θZ axis direction respectively.

In other words, this ensures that no surplus load is applied to the linking unit 20, the linking unit 40, and eventually the actuator 10, reduces the possibility of damage to the linking unit 20 and the linking unit 40, and it is also possible to reduce the damage to the actuator 10. Furthermore, if the load that is applied to the actuator 10 is great, it is necessary to select a large actuator considering that load, but because that is not necessary, it will also lead to a cost reduction. And, by choosing this configuration, excessive position adjustments of the table unit 100B against the injection molding machine 600 and excessive position adjustments of the side guide roller and the bottom guide roller become unnecessary and a cost reduction due to precision loosening of the equipment parts and a reduction of the assembly man-hours during assembly can be achieved.

This application claims the benefit of and priority to U.S. Appl. No. 62/702,701 filed Jul. 24, 2018, which is incorporated by reference herein in its entirety.

The invention claimed is:
1. An injection molding system comprising:
  an injection molding apparatus configured to perform injection molding with a mold, the mold including at least two mold parts clamped to each other;
  an actuator configured to move the mold in a predetermined direction along a supporting plane between a first position in the injection molding apparatus and a second position outside the injection molding apparatus; and
  a linking unit configured to link between the mold and the actuator, wherein the linking unit is configured to link between the mold and the actuator so that the mold is movable in a first direction and a second direction with respect to the actuator, wherein the first direction is parallel with the supporting plane and intersects the predetermined direction, and the second direction intersects the supporting plane, and wherein the linking unit includes (1) a first shaft extending in the first direction and configured to guide movement of the mold along the first direction and (2) a second shaft extending in the second direction and configured to guide movement of the mold along the second direction.

2. The injection molding system according to claim 1, further comprising a clamping unit configured to clamp the at least two mold parts of the mold to each other in the injection molding apparatus.

3. The injection molding system according to claim 1, wherein the first position is a position for injection molding and the second position is a position for cooling the resin in the mold.

4. A method for manufacturing products comprising:
performing injection molding using the injection molding system according to claim 1,
wherein the performing injection molding includes moving the mold using the actuator.

5. The injection molding system according to claim 1, wherein the linking unit includes:
a first holder fixed to the actuator and configured to hold the first shaft; and
a second holder fixed to the mold and configured to hold the second shaft.

6. The injection molding system according to claim 5, wherein the linking unit includes a block member to which the first and second shafts are fixed thereto, and
wherein in a case where a force is applied to the mold in the first direction, the movement of the mold along the first direction is guided by the first holder holding the first shaft, and
wherein in a case where a force is applied to the mold in the second direction, the movement of the mold along the second direction is guided by the second holder holding the second shaft.

7. The injection molding system according to claim 5, wherein the first holder holds the first shaft such that the first holder and the first shaft are moveable relative to each other.

8. The injection molding system according to claim 5, wherein the second holder holds the second shaft such that the second holder and the second shaft are moveable relative to each other.

9. The injection molding system according to claim 5, wherein in a case where a force is applied to the mold, the first holder holding the first shaft guides rotational movement of the mold about an axis of the first shaft.

10. The injection molding system according to claim 5, wherein in a case where a force is applied to the mold, the second holder holding the second shaft guides rotational movement of the mold about an axis of the second shaft.

11. A method for injection molding comprising:
performing injection molding using the injection molding system according to claim 1,
wherein the performing injection molding includes moving the mold using the actuator.

\* \* \* \* \*